United States Patent
Craig et al.

(10) Patent No.: US 12,498,992 B2
(45) Date of Patent: Dec. 16, 2025

(54) METHODS, APPARATUSES, AND COMPUTER PROGRAM PRODUCTS FOR ENABLING DYNAMIC EXTERNAL ACCESS TO A PROCESS SIMULATION SERVICE

(71) Applicant: Honeywell International Inc., Charlotte, NC (US)

(72) Inventors: Mitchell Roy Craig, Calgary (CA); David John Pavan, Calgary (CA); Bharat Naik, Carol Stream, IL (US)

(73) Assignee: Honeywell International Inc., Charlotte, NC (US)

( * ) Notice: Subject to any disclaimer, the term of this patent is extended or adjusted under 35 U.S.C. 154(b) by 419 days.

(21) Appl. No.: 18/197,534

(22) Filed: May 15, 2023

(65) Prior Publication Data
US 2024/0385903 A1    Nov. 21, 2024

(51) Int. Cl.
*G06F 3/00* (2006.01)
*G06F 9/54* (2006.01)

(52) U.S. Cl.
CPC ..................... *G06F 9/54* (2013.01)

(58) Field of Classification Search
CPC ........................................................ G06F 9/50
See application file for complete search history.

(56) References Cited

U.S. PATENT DOCUMENTS 5,247,650 A * 9/1993 Judd .................... G06F 8/45
  703/20
5,963,731 A * 10/1999 Sagawa ............... G06F 30/23
  719/310

(Continued)

FOREIGN PATENT DOCUMENTS

CA    2256507 A1 * 12/1997    ............. G05B 17/02
CN    106228069 B * 7/2019    ............. G06F 21/566

(Continued)

OTHER PUBLICATIONS

Xun Ye, An Industry 4.0 Asset Administration Shell-Enabled Digital Solution for Robot-Based Manufacturing Systems. (Year: 2021).*

(Continued)

*Primary Examiner* — Lechi Truong
(74) *Attorney, Agent, or Firm* — Alston & Bird LLP

(57) ABSTRACT

Methods, apparatuses, and computer program products for enabling dynamic external access to a process simulation service are provided. For example, a computer-implemented method may include establishing, by a process simulation service, a communication endpoint to access one or more API calls that define one or more procedures corresponding to a process simulation model associated with one or more assets of an industrial environment, the one or more procedures determined based at least in part on the one or more assets; receiving, by the process simulation service and via the communication endpoint from an external control service, a request to initiate a particular API call of the one or more API calls, wherein the particular API call initiates an interaction with the process simulation model; and executing, by the process simulation service, the interaction with the process simulation model in response to the request.

11 Claims, 13 Drawing Sheets

(56) References Cited

U.S. PATENT DOCUMENTS

| | | | | |
|---|---|---|---|---|
| 7,079,999 | B2 * | 7/2006 | Nagaki | G06F 30/33 |
| | | | | 703/20 |
| 8,224,767 | B2 | 7/2012 | Swaminathan et al. | |
| 8,902,234 | B1 * | 12/2014 | Sanocki | G06F 30/20 |
| | | | | 345/473 |
| 8,983,823 | B1 * | 3/2015 | Koh | G06F 11/3608 |
| | | | | 703/22 |
| 9,178,997 | B2 * | 11/2015 | Oristian | H04M 3/523 |
| 9,292,631 | B1 * | 3/2016 | Koh | G06F 11/3604 |
| 9,846,774 | B2 * | 12/2017 | Alme | G06F 21/566 |
| 10,037,443 | B2 | 7/2018 | Maturana et al. | |
| 2009/0007144 | A1 * | 1/2009 | Blue | G06F 11/3668 |
| | | | | 719/321 |
| 2010/0262900 | A1 | 10/2010 | Romatier et al. | |
| 2013/0338972 | A1 * | 12/2013 | Chao | G06Q 10/0637 |
| | | | | 703/1 |
| 2014/0180644 | A1 * | 6/2014 | Maturana | G05B 19/05 |
| | | | | 703/1 |
| 2015/0286626 | A1 * | 10/2015 | Romatier | G06F 3/04847 |
| | | | | 715/217 |
| 2016/0024893 | A1 * | 1/2016 | Al-Zawawi | G06F 30/20 |
| | | | | 703/10 |
| 2016/0098038 | A1 * | 4/2016 | Maturana | G05B 19/41885 |
| | | | | 703/20 |
| 2019/0318122 | A1 * | 10/2019 | Hockey | G06F 21/6245 |
| 2020/0387149 | A1 * | 12/2020 | Nixon | G05B 19/41865 |
| 2021/0102868 | A1 * | 4/2021 | Ryyppö | G01M 13/025 |
| 2021/0174403 | A1 * | 6/2021 | Bellini | G06Q 10/06316 |
| 2021/0319151 | A1 * | 10/2021 | Chen | G06F 30/20 |
| 2022/0261299 | A1 * | 8/2022 | Dhondse | G06N 5/022 |
| 2022/0375551 | A1 | 11/2022 | Patel et al. | |
| 2024/0135074 | A1 * | 4/2024 | Bandyopadhyay | G06F 30/33 |

FOREIGN PATENT DOCUMENTS

| | | | | | |
|---|---|---|---|---|---|
| EP | | 2871540 | A2 * | 5/2015 | G06F 30/20 |
| EP | | 2924562 | A2 * | 9/2015 | G06F 9/451 |
| TW | | M599431 | U * | 8/2020 | |
| TW | | I732466 | B * | 7/2021 | |
| WO | | 2010/120579 | A2 | 10/2010 | |
| WO | WO-2013028211 | | A1 * | 2/2013 | G06Q 10/0637 |

OTHER PUBLICATIONS

Fabiano Pallonetto et al., "SimApi, a smartgrid co-simulation software platform for benchmarking building control algorithms," SoftwareX, 9:271-281, (2019). [Retrieved from the Internet Jul. 28, 2023: URL: <https://www.researchgate.net/publication/331906867_SimApi_a_smartgrid_co-simulation_software_platform_for_benchmarking_building_control_algorithms>].

Mukund Rajamony et al., "Remote Simulation helps you schedule jobs and review results seamlessly," Siemens, 3 pages, (Dec. 14, 2022). [Retrieved from the Internet Jul. 28, 2023: URL: <https://blogs.sw.siemens.com/simcenter/remote-simulation-schedule-review/>].

Scott Fortmann-Roe, "Insight Maker: A general-purpose tool for web-based modeling & simulation," Simulation Modelling Practice and Theory, 47:28-45, (Sep. 2014). [Retrieved from the Internet Jul. 27, 2023: URL: <https://www.sciencedirect.com/science/article/pii/S1569190X14000513?ref=pdf_download&fr=RR-2&rr=7ed67c4148e6b093>].

* cited by examiner

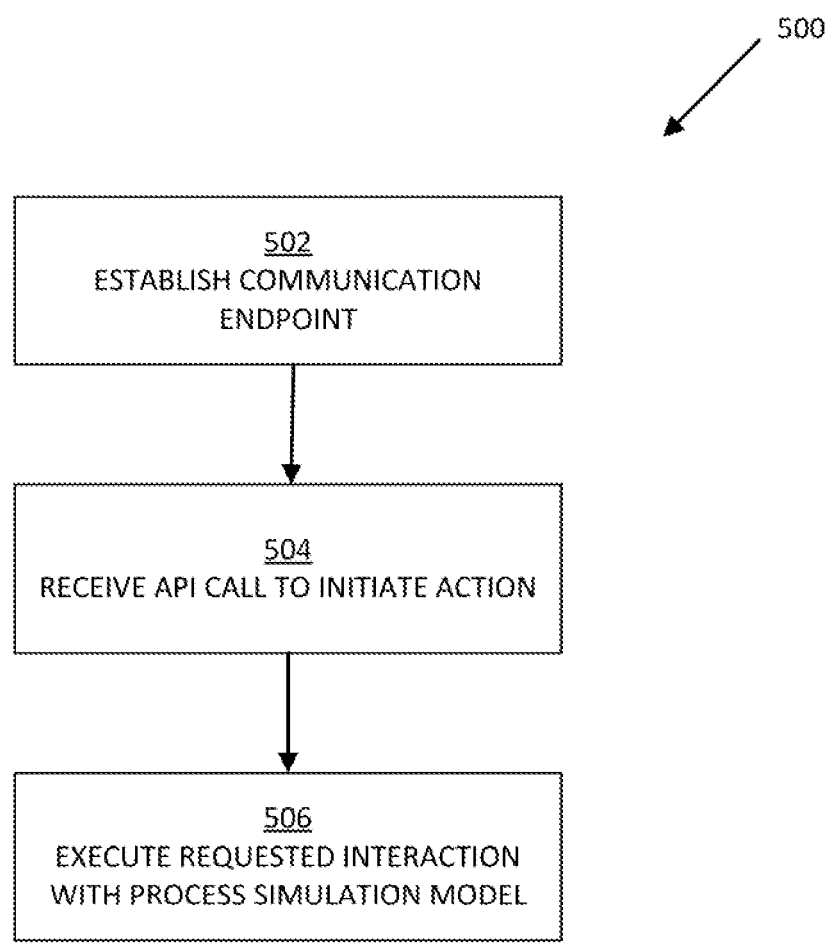

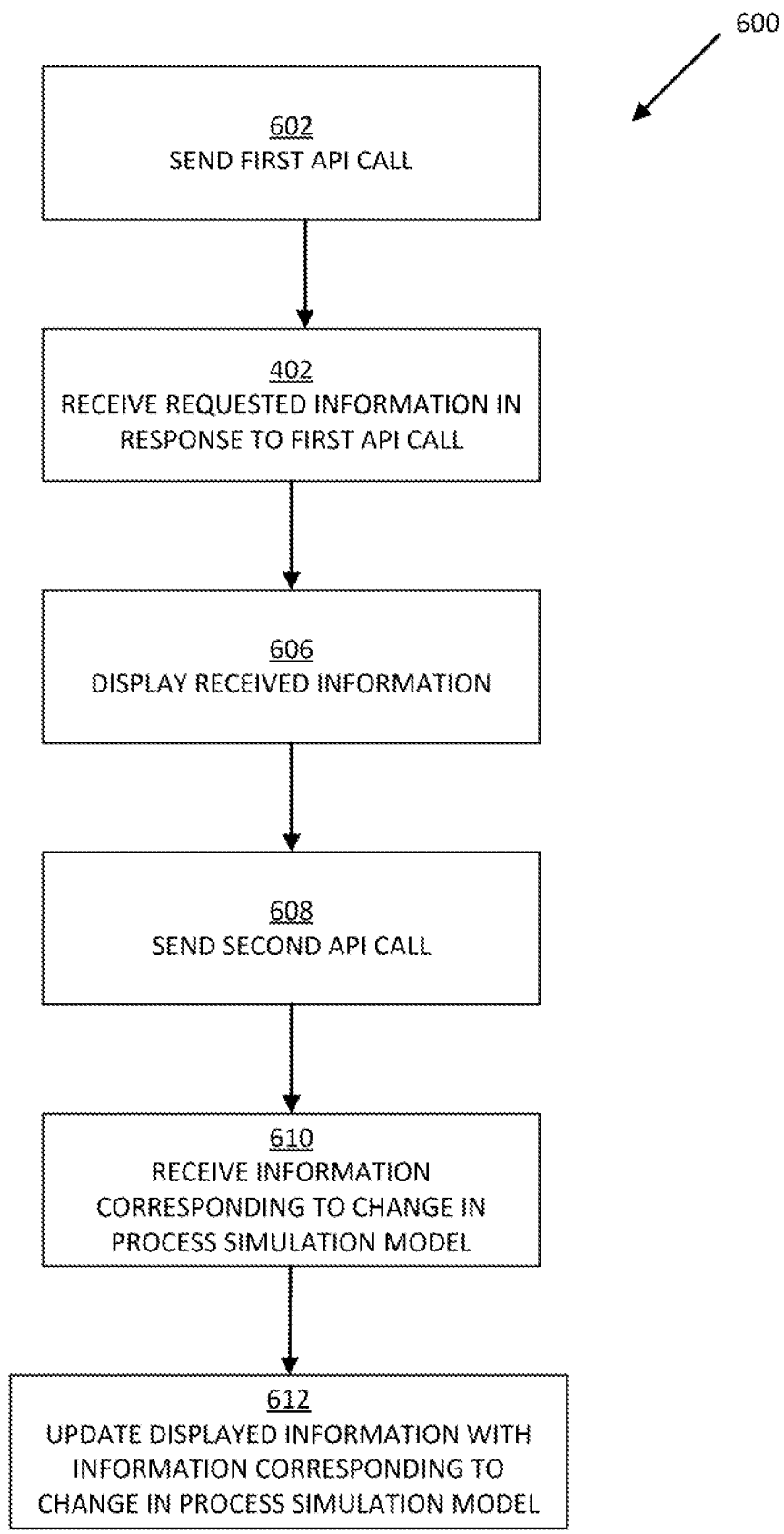

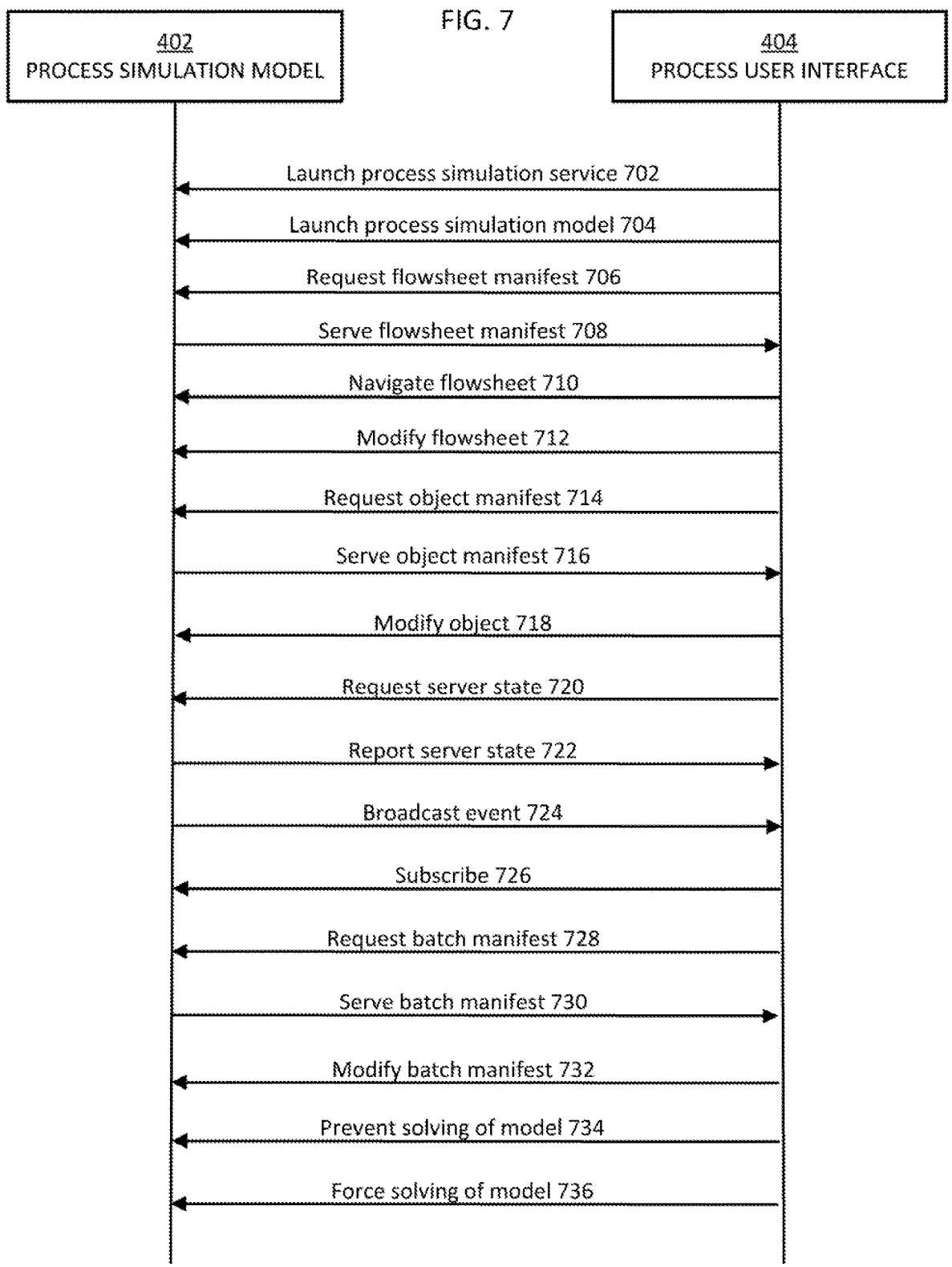

FIG. 9A

```
    Launch Process Simulation Service Application
1       from usdapi.unisimdesignapi import UniSimDesign
2
3       usd = UniSimDesign()
```

FIG. 9B

```
Launch with a Case
1       from usdapi.unisimdesignapi import UniSimDesign
2       case_name = r"comploop.usc"
3       case_path = os.path.join(sys.path[0],f'..\\..\\Resources\\{case_name}')
4       usd = UniSimDesign(case_path)
```

FIG. 9C

```
1       # place engine "on hold"
2       usdapp.solve_hold()
3
4       # create usdop controller instance
5       op = UsdController(usdapp.simcase, 'LIC-100')
6
7       # get several vars from op
8       val1 = op.OP
9       val2 = op.SP
10      val3 = op.PV
11      val4 = op.AlarmPVLevelPriority
12
13      # set select var in op
14      op.SP = 30
15
16      # initiate solve
17      usdapp.solve()
```

FIG. 9D

```
1   # place engine "on hold"
2   usdapp.solve_hold()
3
4   # create usdop controller instance
5   stream = usd.get_stream('CCR Heavy Naphtha')
6
7   # get several vars from stream as batch
8   variables = List[IUsdVariable](stream._actual.Temperature, stream._actual.Pressure, stream._actual.MassFlow)
9   values = usdapp_simcase.GetVariableValues(variables)
```

METHODS, APPARATUSES, AND COMPUTER PROGRAM PRODUCTS FOR ENABLING DYNAMIC EXTERNAL ACCESS TO A PROCESS SIMULATION SERVICE

TECHNOLOGICAL FIELD

The present disclosure generally relates to process simulation systems related to industrial assets in an industrial environment, and more particularly to providing external access to a process simulation system.

BACKGROUND

An industrial environment generally includes physical assets such machines, sensors, equipment, computing devices, and/or other types of industrial assets configured to execute one or more industrial processes. Process simulation tools, such as asset models and process digital twin systems, are often used to model and/or monitor such industrial environments.

However, Applicant has discovered many technological inefficiencies related to the accessing such traditional asset models.

BRIEF SUMMARY

The details of some embodiments of the subject matter described in this specification are set forth in the accompanying drawings and the description below. Other features, aspects, and advantages of the subject matter will become apparent from the description, the drawings, and the claims.

In accordance with a first aspect of the disclosure, a computer-implemented method for enabling dynamic external access to a process simulation service is provided. In at least one example embodiment, an example method comprises establishing, by a process simulation service, a communication endpoint to access one or more API calls that define one or more procedures corresponding to a process simulation model associated with one or more assets of an industrial environment, the one or more procedures determined based at least in part on the one or more assets; receiving, by the process simulation service and via the communication endpoint from an external control service, a request to initiate a particular API call of the one or more API calls, wherein the particular API call initiates an interaction with the process simulation model; and executing, by the process simulation service, the interaction with the process simulation model in response to the request.

In some embodiments, the one or more API calls comprise a load simulation call specifying a representation of the assets of the industrial environment to run a simulation on to generate the process simulation model.

In some embodiments, the one or more API calls comprise a change attribute value call, and the method further comprises, in response to a change attribute value call, changing an attribute value to a specified value.

In some embodiments, the one or more API calls comprise a get flowsheet objects call, and the method further comprises, in response to a get flowsheet objects call, sending a listing of the one or more assets and connections between the one or more assets.

In some embodiments, the one or more API calls comprise a request attribute value call, and the method further comprises, in response to a request attribute value call, sending a current value of a requested attribute.

In some embodiments, the one or more API calls comprise a request asset properties call, and the method further comprises, in response to a request asset properties call, sending a listing of properties for at least one of the one or more assets.

In some embodiments, the method further comprises registering an event notification trigger with the process simulation service, the event notification trigger associated with completion of at least the interaction with the process simulation model.

In accordance with another aspect of the disclosure, an apparatus for enabling dynamic external access to a process simulation service is provided. The apparatus comprises at least one processor and at least one non-transitory memory comprising program code. The at least one non-transitory memory and the program code are configured to, with the at least one processor, cause the apparatus to at least establish, by a process simulation service, a communication endpoint to access one or more API calls that define one or more procedures corresponding to a process simulation model associated with one or more assets of an industrial environment, the one or more procedures determined based at least in part on the one or more assets; receive, by the process simulation service and via the communication endpoint from an external control service, a request to initiate a particular API call of the one or more API calls, wherein the particular API call initiates an interaction with the process simulation model; and execute, by the process simulation service, the interaction with the process simulation model in response to the request.

In accordance with yet another aspect of the disclosure, an example computer program product for enabling dynamic external access to a process simulation service is provided. The example computer program product includes at least one non-transitory computer-readable storage medium having computer-readable program code portions stored therein, the computer-readable program code portions comprising an executable portion configured to at least establish, by a process simulation service, a communication endpoint to access one or more API calls that define one or more procedures corresponding to a process simulation model associated with one or more assets of an industrial environment, the one or more procedures determined based at least in part on the one or more assets; receive, by the process simulation service and via the communication endpoint from an external control service, a request to initiate a particular API call of the one or more API calls, wherein the particular API call initiates an interaction with the process simulation model; and execute, by the process simulation service, the interaction with the process simulation model in response to the request.

BRIEF DESCRIPTION OF THE SEVERAL VIEWS OF THE DRAWINGS

Figure 1:
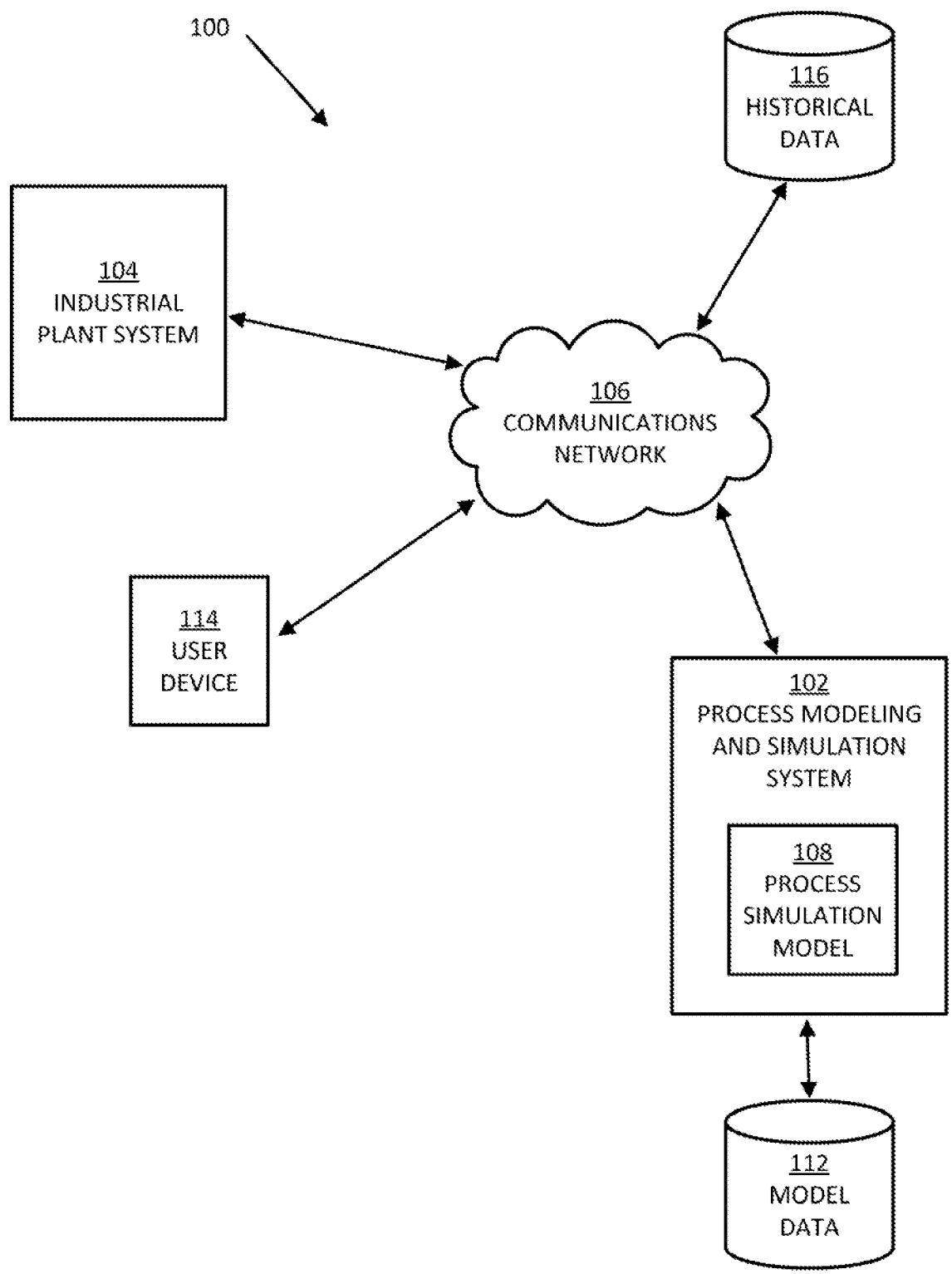
Figure 2:
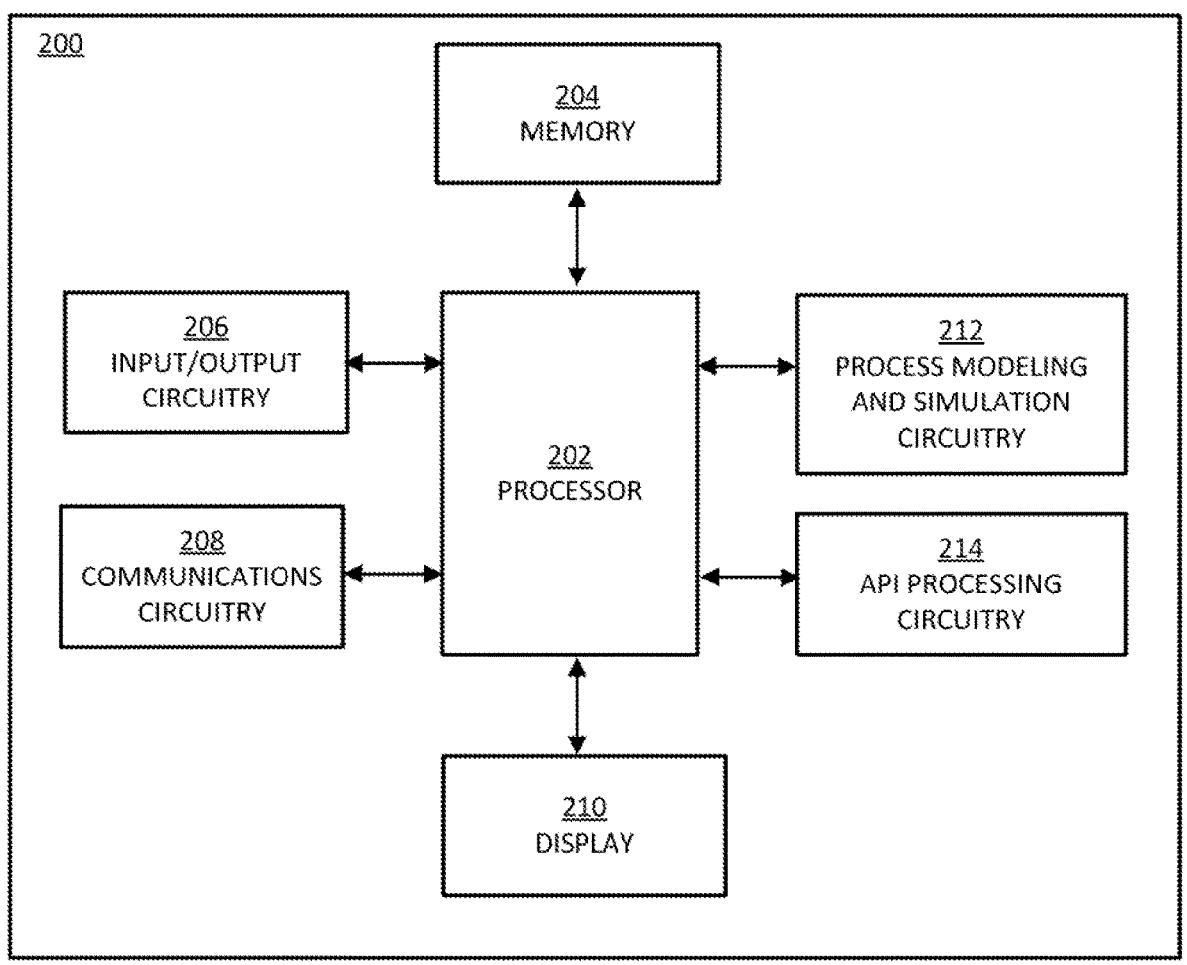
Figure 3:
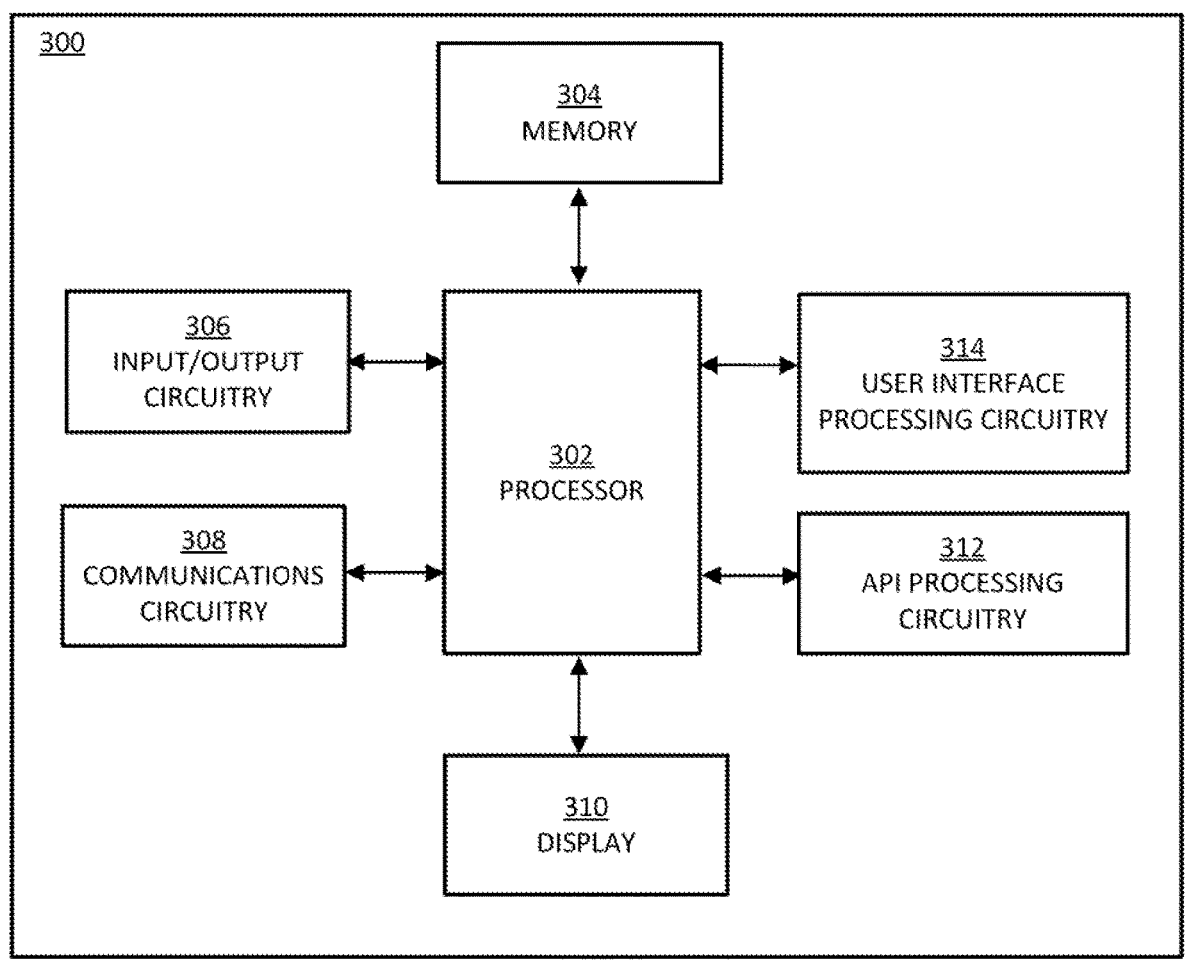
Figure 4:
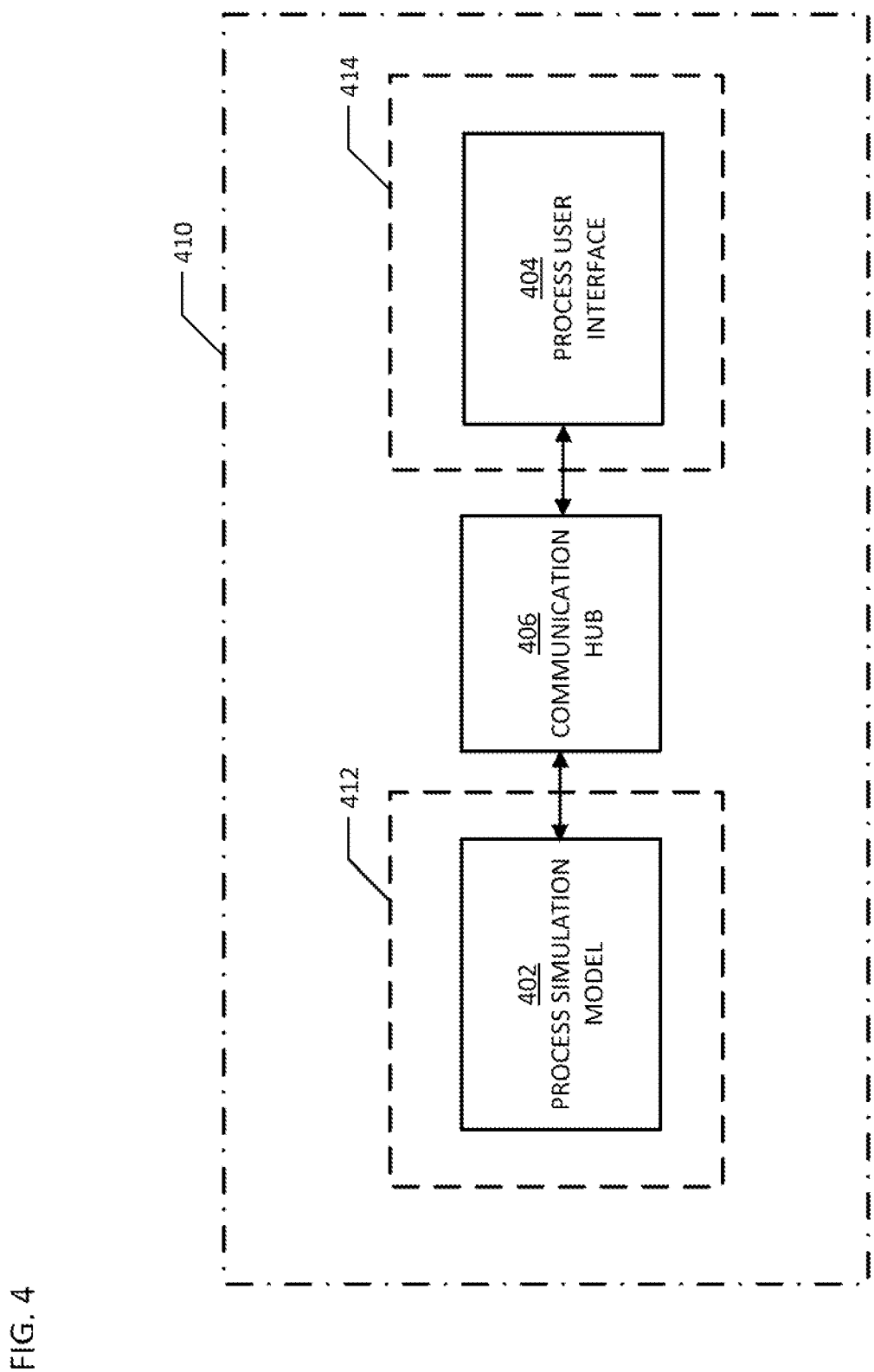

Having thus described the embodiments of the disclosure in general terms, reference now will be made to the accompanying drawings, which are not necessarily drawn to scale, and wherein:

FIG. 1 illustrates a block diagram of a system that may be specially configured within which embodiments of the present disclosure may operate;

FIG. 2 illustrates a block diagram of an example apparatus that may be specially configured in accordance with an example embodiment of the present disclosure;

FIG. 3 illustrates a block diagram of another example apparatus that may be specially configured in accordance with an example embodiment of the present disclosure;

FIG. 4 illustrates a block diagram of example architectures in accordance with example embodiments of the present disclosure;

FIG. 5 illustrates a flow chart including operational blocks of an example process for enabling dynamic external access to a process simulation service, in accordance with an example embodiment of the present disclosure;

FIG. 6 illustrates a flow chart including operational blocks of an example process for providing a dynamic external user interface to a process simulation service, in accordance with an example embodiment of the present disclosure;

FIG. 7 illustrates a signal diagram of an example process for providing a dynamic external user interface to a process simulation service, in accordance with an example embodiment of the present disclosure;

FIGS. 8A-8D illustrate example user interface displays which may be displayed by a dynamic external user interface, in accordance with an example embodiment of the present disclosure; and FIGS. 9A-9D illustrate example API calls of an example process for providing a dynamic external user interface to a process simulation service, in accordance with an example embodiment of the present disclosure.

DETAILED DESCRIPTION

The term "or" is used herein in both the alternative and conjunctive sense, unless otherwise indicated. Terms such as "computing," "determining," "generating," and/or similar words are used herein interchangeably to refer to the creation, modification, or identification of data. Further, "based on," "based on in part on," "based at least on," "based upon," and/or similar words are used herein interchangeably in an open-ended manner such that they do not indicate being based only on or based solely on the referenced element or elements unless so indicated. Like numbers refer to like elements throughout.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

The term "industrial plant," "plant," and/or similar terms used herein interchangeably may refer to one or more buildings, complex, or arrangement of components that perform a chemical, physical, electrical, mechanical process, and/or the like for converting input materials into one or more output products. Non-limiting examples of an industrial plant include a chemical industrial plant, automotive manufacturing plant, distillery, oil refinery, fabric manufacturing plant, and/or the like.

The term "physical component" with respect to an industrial plant may refer to asset(s) within or associated with the industrial plant. Such assets, for example, may include real-world equipment, systems, or other physical structures within and/or associated with the industrial plant, and that is utilized by the industrial plant. For example, a physical component with respect to an industrial plant may comprise equipment, systems, or other structures that are utilized in a process performed by the industrial plant. In an example context of an oil refinery, non-limiting examples of a physical component may include a furnace, a pump, a heat exchanger, a distillation column, and/or the like.

The term "process simulation model," which may also be termed an "asset model," refers to a model-based representation of one or more processes of an industrial plant. A process simulation model may be configured to facilitate designing, developing, analyzing, monitoring, controlling, optimizing, and/or the like one or more processes of the industrial plant. Such processes for example, may include chemical processes, biological processes, and/or the like. In one or more embodiments, a process simulation model embodies a flowsheet that describes the process flow through an industrial plant. A non-limiting example of a process simulation model is a first principle-based simulation model that models equipment and/or processes based on fundamental laws of physics, thermodynamics, kinetics, chemistry, etc. For example, a feed stream associated with a gas refrigeration plant may be defined in a process simulation model in terms of its physical and/or chemical properties. As another example, a feed stream associated with a crude oil processing plant may be defined in a process simulation model in terms of its physical and/or chemical properties. One or more inputs to a process simulation model may be fixed input(s), while one or more inputs to the process simulation model may be variable input(s). Additionally or alternatively, one or more inputs to the process simulation model may be a computed value, for example, by the process simulation model. Additionally or alternatively, one or more inputs to the process simulation model may comprise data received from the plant. As a non-limiting example, such data received from the plant may comprise equipment and/or process variable measurements (e.g., sensor-based measurements). In one or more embodiments, execution of a process simulation model includes performing one or more operations. As a non-limiting example, the one or more operations may include an optimization operation with respect to one or more objective functions (e.g., minimum energy, maximum production, maximum profit, minimum cost, and/or the like) in order to determine optimal operating points/conditions for specified parameter(s). An optimal operating point/condition for a specified parameter, for example, may describe a stable operating point/condition for the specified parameter. In some embodiments, a process simulation model may comprise a steady-state model or a dynamic model. For example, in some embodiments a process simulation model may simulate a steady state process and/or a dynamic process. In some embodiments, a process simulation model may be associated with or otherwise embodied by a digital twin model.

A process simulation model may include hundreds or thousands of assets, and one or more "attributes" may be associated with each asset. An "attribute" defines a particular feature or value related to the asset. Non-limiting examples of an attributes include raw data values that are measured in the plant, such as temperature and flow; values that are used for calculations within the model, including conversion factors or constants; the results of intermediate or final calculations; and/or simulation or optimization results.

A "flowsheet" is a graphic representation of a process flow between assets of an industrial plant. A process simulation model in some contexts is created from a flowsheet. A flowsheet in some contexts includes or is linked to one or more "process data tables." A flowsheet in some contexts includes one or more input data tables defining the inputs to the process simulation model and one or more output data tables defining the outputs from the process simulation model. A flowsheet in some contexts includes a source data table that indicates which variables from the industrial plant should be mapped to which inputs.

A process simulation model in some embodiments relies on a "time-series database" (TSDB), and such a TSDB is often created as part of creating a process simulation model. Many, if not most, of the attribute values of a process simulation model change over time. Such a TSDB records the values of the attributes at different times. Depending on the state of the plant and the process models, the time intervals at which the attributes are recorded may vary.

A "digital twin model," "process digital twin," "process digital twin system," and the like refers to a digital, model-based representation of physical components (e.g., equipment, system, processes, etc.) in operation. In one or more embodiments, a digital twin model is configured to run with plant data in that incoming data (e.g., operational data) from the plant is fed into the digital twin model to update the model. As such, a digital twin model may describe a representation of equipment and/or processes of an industrial plant that reflects the current operating conditions. A digital twin model may be used to monitor, refine, control, predict, and/or optimize operations of the industrial plant. In some embodiments, the digital twin model may comprise one or more process simulation models and/or one or more data-driven models.

"Cloud-hosted" refers to a resource (for example, an application, website, etc.) that resides on a server or other computing device that is accessible to remote users via the internet or other network. A cloud-hosted resources may be publicly accessible to any internet connected device or may be access-restricted such that only authorized users may access the resource. Cloud-hosted resources are typically formatted to enable access to the resource via a standard web browser.

Various embodiments of the present disclosure address technical challenges related to accessing and providing a user interface to a process simulation model of a process simulation service. Specifically, embodiments of the present disclosure enable dynamic external access to a process simulation service and provide a dynamic user interface to a process simulation service. Embodiments of the present disclosure enable dynamic, duplex API calls to and from a process simulation service to enable an alternative user interface (UI) to a process simulation model running on the process simulation service.

The dynamic, duplex API calls enable a user to write applications which can interact with and drive operations of a process simulation model. In some embodiments, the dynamic, duplex API calls enable communication across a network, with a client application driving a process simulation service instance located on a remote server. Similarly, in some embodiments the dynamic, duplex API calls enable inter-process communication between a client application and the process simulation service application running on the same device.

Embodiments of the present disclosure herein include systems, apparatuses, methods, and computer program products that enable dynamic external access to a process simulation system/service and enable providing a dynamic user interface to a process simulation system/service. It should be readily appreciated that the embodiments of the apparatus, systems, methods, and computer program product described herein may be configured in various additional and alternative manners in addition to those expressly described herein.

FIG. 1 illustrates a block diagram of an system 100 in which embodiments of the present disclosure may operate. Specifically, FIG. 1 illustrates an industrial plant system 104 system in communication with a process modeling and simulation system 102. In some embodiments, the industrial plant system 104 communicates with the process modeling and simulation system 102 (which may also be termed a process simulation service) over one or more communication network(s), for example a communications network 106. In some embodiments, the industrial plant system 104 is in communication with a plurality of plant systems, each identically or similarly configured to the industrial plant system 104. In some such embodiments, the process modeling and simulation system 102 may process data associated with each industrial plant system 104 independently, and/or in some contexts processes data associated with multiple industrial plant systems 104 in the aggregate (e.g., when processing all industrial plant systems 104 associated with a particular entity, region, and/or the like). In some embodiments, the process modeling and simulation system 102 includes one or more process simulation models 108. The one or more process simulation models may at least in part represent a digital twin model. For example, in some embodiments, the process modeling and simulation system 102 may comprise a digital twin model that is the process simulation model 108 or may comprise a digital twin model that includes one or more process simulation models 108 and/or one or more data-driven models. As depicted in FIG. 1, in some embodiments, the process modeling and simulation system 102 includes one or more process simulation models 108. As further depicted in FIG. 1, in some embodiments, the process modeling and simulation system 102 includes a model data storage system 112 that may be external (as illustrated) or internal to the process modeling and simulation system 102. For example, the model data storage system 112 may be comprise a part of a separate system in communication with the process modeling and simulation system 102 (e.g., via the communications network 106).

As depicted in FIG. 1, in some embodiments, the process modeling and simulation system 102 may be in communication with a historical data storage system 116 that may be external (as illustrated) or internal to the process modeling and simulation system 102. For example, the historical data storage system 116 may be a part of a separate system in communication with the process modeling and simulation system 102 (e.g., via the communications network 106). In some embodiments, the historical data storage system 116 comprises a cloud historian collector (CHC) that uses a Laboratory Information Management System (LIMS) database that stores historical values for one or more of the asset attribute values from the industrial plant system 104.

As depicted in FIG. 1, in some embodiments, the process modeling and simulation system 102 may be in communication with a user device 114 that may be external (as illustrated) or internal to the process modeling and simulation system 102. In some embodiments, the user device 114 enables a user to create and interact with a process simulation model.

It should be appreciated that the communications network 106 in some embodiments is embodied in any of a myriad of network configurations. In some embodiments, the communications network 106 embodies a public network (e.g., the Internet). In some embodiments, the communications network 106 embodies a private network (e.g., an internal localized, or closed-off network between particular devices). In some other embodiments, the communications network 106 embodies a hybrid network (e.g., a network enabling internal communications between particular connected devices and external communications with other devices). The communications network 106 in some embodiments includes one or more base station(s), relay(s), router(s), switch(es), cell tower(s), communications cable(s) and/or associated routing station(s), and/or the like. In some embodiments, the communications network 106 includes one or more user controlled computing device(s) (e.g., a user owned router and/or modem) and/or one or more external utility devices (e.g., Internet service provider communication tower(s) and/or other device(s)).

In some embodiments, each of the components of the system 100 communicatively are coupled to transmit data to and/or receive data from one another over the same or different wireless and/or wired networks embodying the communications network 106. Such configuration(s) include, without limitation, a wired or wireless Personal Area Network (PAN), Local Area Network (LAN), Metropolitan Area Network (MAN), Wide Area Network (WAN), and/or the like. Additionally, while FIG. 1 illustrate certain system entities as separate, standalone entities communicating over the communications network 106, the various embodiments are not limited to this architecture. In other embodiments, one or more computing entities share one or more components, hardware, and/or the like, or otherwise are embodied by a single computing device such that connection(s) between the computing entities are over the communications network 106 are altered and/or rendered unnecessary. For example, in some embodiments, the industrial plant system 104 includes some or all of the process modeling and simulation system 102, such that an external communications network 106 is not required.

In some embodiments, the industrial plant system 104 and the process modeling and simulation system 102 are embodied in an on-premises system within or associated with the industrial plant. In some such embodiments, the industrial plant system 104 and the process modeling and simulation system 102 are communicatively coupled via at least one wired connection. Alternatively or additionally, in some embodiments, the industrial plant system 104 embodies or includes the process modeling and simulation system 102, for example as a software component of a single enterprise terminal.

The industrial plant system 104 includes any number of computing device(s), system(s), physical component(s), and/or the like, that facilitates producing of any number of products, for example utilizing particular configurations that cause processing of particular inputs available within the industrial plant system 104. In some embodiments, the industrial plant system 104 includes one or more physical component(s), connection(s) between physical component(s), and/or computing system(s) that control operation of each physical component therein. In some embodiments, a physical component describes asset(s) within or associated with an industrial plant. Such assets, for example, may include real-world equipment, systems, or other physical structures within and/or associated with the industrial plant, and that is utilized by the industrial plant. For example, a physical component with respect to an industrial plant may comprise equipment, systems, or other structures that are utilized in a process performed by the industrial plant. In an example context of an oil refinery plant, non-limiting examples of a physical component may include a furnace, a pump, a heat exchanger, and/or the like. The industrial plant system 104, for example, can embody an oil refinery, an automotive engine manufacturing plant, a distillery, and/or the like, which includes physical component(s) that perform particular process(es) to alter properties of inputs to the component(s). Additionally or alternatively, in some embodiments the industrial plant system 104 includes one or more computing system(s) that are specially configured to operate the physical component(s) in a manner that produces one or more particular product(s) simultaneously. In some embodiments, an industrial plant system 104 includes one or more computing device(s) and/or system(s) embodied in hardware, software, firmware, and/or a combination thereof, that configure and/or otherwise control operation of one or more physical component(s) in the corresponding industrial plant(s). For example, in some embodiments, such computing device(s) and/or system(s) include one or more programmable logic controller(s), MPC(s), application server(s), centralized control system(s), and/or the like, that control(s) configuration and/or operation of at least one physical component. It will be appreciated that different industrial plant system(s) may include or otherwise be associated with different physical component(s), computing system(s), and/or the like.

The process modeling and simulation system 102 includes one or more computing device(s) and/or system(s) embodied in hardware, software, firmware, and/or a combination thereof, that can model and/or simulate process(es) associated with an industrial plant. In some embodiments, the process modeling and simulation system 102 includes one or more specially configured application server(s), database server(s), end user device(s), cloud computing system(s), and/or the like. Additionally or alternatively, in some embodiments, the process modeling and simulation system 102 includes one or more user device(s) that enables access to functionality provided by the process modeling and simulation system 102, for example via a web application, native application, and/or the like. For example, in some embodiments, the process modeling and simulation system 102 provides cloud-based functionality to an end-user that facilitates cloud-based monitoring, controlling, optimization, etc., of an industrial plant system, such as industrial plant system 104

The process modeling and simulation system 102 can be used for, for example, designing, analyzing, monitoring, controlling, and/or optimizing an industrial plant. In one or more embodiments, the process modeling and simulation system 102 is configured to output data that reflects optimal operating points/conditions for one or more specified parameters associated with an equipment and/or process of an industrial plant, such as an industrial plant embodied by the industrial plant system 104. For example, the process modeling and simulation system 102, can be configured to perform, based at least in part on input data associated with the industrial plant, one or more modeling operations and/or simulation operations that facilitates generation of model-predicted data, wherein the model predicted prediction(s) may be used to facilitate designing, analyzing, monitoring, controlling, and/or optimizing equipment and/or process(es) of an industrial plant. In some embodiments, the process modeling and simulation system 102 includes one or more application server(s) and/or database server(s) that provide such functionality. Additionally or alternatively, in some embodiments, the process modeling and simulation system 102 includes one or more client device(s), user device(s), and/or the like, such as user device 114, that enable access to the functionality provided via the process modeling and simulation system 102, for example via a web application, a native application, and/or the like executed on the client device. In some embodiments, the process modeling and simulation system 102 includes or embodies a display or other user interface to which a user-facing interface is renderable.

In some embodiments, the process modeling and simulation system 102 and industrial plant system 104 communicate with one another to perform the various actions described herein. For example, in some embodiments, the process modeling and simulation system 102 and the industrial plant system 104 communicate in order to generate model-predicted data associated with operation of the industrial plant (e.g., embodied by the industrial plant system 104). Additionally or alternatively, in some embodiments, the process modeling and simulation system 102 and the industrial plant system 104 communicate to facilitate control or adjustment of operation of physical component(s) in the industrial plants based at least in part on the generated model-predicted data. For example, in some embodiments the process modeling and simulation system 102 and the industrial plant system 104 can communicate to automatically configure or reconfigure one or more physical component(s) of the industrial plant based on the model-predicted data. In some embodiments, the process modeling and simulation system 102 includes a process simulation model 108. In some embodiments, the process modeling and simulation system 102 includes a plurality of process simulation models 108.

In some embodiments, a process simulation model 108 is a model-based representation of one or more assets of an industrial plant (e.g., industrial plant embodied by the industrial plant system 104). A process simulation model 108 may comprise one or more asset models, that each represent an asset associated with the industrial plant system 104. An asset may include equipment and/or processes associated with the industrial plant system 104 (e.g., industrial plant thereof) and/or their units. One or more inputs to process simulation model 108 may be fixed input(s), while one or more inputs to process simulation model 108 may be variable input(s). Additionally or alternatively, one or more inputs to the process simulation model may be a computed value. In one or more embodiments, an input to the process simulation model 108 that is a computed value is determined (e.g., computed) by the process simulation model 108 embodied by the process modeling and simulation system 102. Additionally or alternatively, one or more inputs to the process simulation model may comprise data received from the industrial plant system 104. Such data (e.g., plant data) may comprise operational data received from the plant, such as process variable measurements and/or equipment variable measurements. In an example context, one or more equipment and/or processes associated with the industrial plant system 104 may include sensor devices for measuring certain variables (e.g., temperature, pressure, etc.) with respect to the equipment and/or processes. In some embodiments, a particular process simulation model 108 may be a first principle-based simulation model that models equipment and/or processes based on fundamental laws of physics, thermodynamics, kinetics, chemistry, etc. For example, a feed stream associated with a gas refrigeration plant, or a crude oil processing plant may be defined in the process simulation model 108 in terms of its physical and/or chemical properties. Additionally or alternatively, one or more inputs to the process simulation model may comprise historical data related to the industrial plant system 104, such as from a historical data storage system 116. Such historical data may comprise operational data, such as process variable measurements and/or equipment variable measurements, captured from the plant over a prior predetermined time period.

In one or more embodiments, process simulation model 108 can implement an algorithm based on inter-related asset models for the industrial plant (e.g., embodied by the industrial plant system 104) to model and/or simulate assets of the plant, and to generate prediction(s). In some embodiments, prediction(s) may comprise model-predicted data that represent or otherwise reflect predicted plant performance, comparison of current plant performance against historical plant performance to detect changes associated with operation of the plant such as changes in equipment and/or process(es). Additionally or alternatively, the model-predicted data may comprise data indicative of operating points/condition(s) for one or more equipment and/or process variables. In one or more embodiments, process simulation model 108 may facilitate designing, developing, analyzing, monitoring, controlling, optimizing, and/or the like of one or more equipment and/or processes of the industrial plant. Such processes, for example, may include chemical processes, biological processes, and/or the like. In one or more embodiments, process simulation model 108 embodies a flowsheet that describes the process flow through the industrial plant.

In one or more embodiments the process modeling and simulation system 102 and/or the process simulation model 108 may represent a digital twin (e.g., digital twin model) with respect to an industrial plant embodied by the industrial plant system 104. For example, as described above, in one or more embodiments, the process simulation model 108 is a digital twin model of one or more processes of the industrial plant. For example, in some examples, the process modeling and simulation system 102 comprises a digital twin model that is a process simulation model 108. In some examples, the process modeling and simulation system 102 comprises a digital twin model that includes one or more process simulation. A digital twin model with respect to an industrial plant may describe a model-based representation of physical components (e.g., equipment, system, processes, etc.) in operation. The digital twin model (e.g., process simulation model 108 thereof) may be configured to run with plant data in that incoming data from the plant is fed into the digital twin model to update the model. As described above, plant data (e.g., operational data) may include measurements of one or more measured process variables and/or equipment variables. As such, a digital twin model may describe at least in part a representation of equipment and/or processes of an industrial plant that reflects the current operating conditions, and may be used to monitor, refine, control, predict, and/or optimize operations of the industrial plant. Additionally or alternatively, the digital twin model may be used to collect and store various data associated with the operation of the industrial plant.

In one or more embodiments, execution of a process simulation model 108 includes performing one or more operations to output prediction(s) (e.g., model-predicted data) that reflect operation of the industrial plant embodied by the industrial plant system 104, and that in turn can be used for monitoring, controlling, analyzing, and/or optimizing equipment and processes of the industrial plant. As a non-limiting example, the one or more operations may include an optimization operation with respect to one or more optimization objective functions (e.g., minimum energy, maximum production, maximum profit, minimum cost, and/or the like) and/or constraints in order to determine optimal operating points/conditions for specified parameter(s). An optimal operating point/condition for a specified parameter, for example, may describe a stable operating point/condition for the specified parameter. Non-limiting examples of constraints with respect to an optimization operation include physical equipment limits, safe operating limits, product quality specifications, product flows (minimum or maximum limits), energy use, feed availability, and/or the like. In some embodiments, a process simulation model 108 may comprise a steady-state model or a dynamic model in that the process simulation model 108 may be a steady state representation or dynamic representation of process(es) of and industrial plant.

FIG. 2 illustrates a block diagram of an example apparatus that may be specially configured in accordance with an example embodiment of the present disclosure. Specifically, FIG. 2 depicts an example computing apparatus 200 specially configured in accordance with at least some example embodiments of the present disclosure. In some embodiments, the process modeling and simulation system 102, and/or a portion thereof, is embodied by one or more system(s), such as the apparatus 200 as depicted and described in FIG. 2. The apparatus 200 includes processor 202, memory 204, input/output circuitry 206, communications circuitry 208, display 210, process modeling and simulation circuitry 212, and API processing circuitry 214. In some embodiments, the apparatus 200 is configured, using one or more of the sets of circuitry 202-214 to execute and perform the operations described herein.

In general, the terms computing entity (or "entity" in reference other than to a user), device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In some embodiments, these functions, operations, and/or processes can be performed on data, content, information, and/or similar terms used herein interchangeably. In this regard, the apparatus 200 embodies a particular, specially configured computing entity transformed to enable the specific operations described herein and provide the specific advantages associated therewith, as described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the apparatus 200 provide or supplement the functionality of another particular set of circuitry. For example, the processor 202 in some embodiments provides processing functionality to any of the sets of circuitry, the memory 204 provides storage functionality to any of the sets of circuitry, the communications circuitry 208 provides network interface functionality to any of the sets of circuitry, and/or the like.

In some embodiments, the processor 202 (and/or co-processor or any other processing circuitry assisting or otherwise associated with the processor) is/are in communication with the memory 204 via a bus for passing information among components of the apparatus 200. In some embodiments, for example, the memory 204 is non-transitory and may include, for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the apparatus 200 to carry out various functions in accordance with example embodiments of the present disclosure.

The processor 202 may be embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 200, and/or one or more remote or "cloud" processor(s) external to the apparatus 200.

In an example embodiment, the processor 202 is configured to execute instructions stored in the memory 204 or otherwise accessible to the processor. Alternatively or additionally, the processor 202 in some embodiments is configured to execute hard-coded functionality. As such, whether configured by hardware or software methods, or by a combination thereof, the processor 202 represents an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions specifically configure the processor 202 to perform the algorithms embodied in the specific operations described herein when such instructions are executed.

As one particular example embodiment, the processor 202 is configured to perform various operations associated with the process simulation model 108. In some embodiments, the processor 202 includes hardware, software, firmware, and/or a combination thereof, for implementing one or more algorithms to model and simulate the execution of defined process(es) within the process simulation model 108, for example, based on inter-related asset models associated with the industrial plant system 104. For example, in some embodiments, the processor 202 includes hardware, software, firmware, and/or a combination thereof, for performing a variety of calculations associated with the process simulation model 108. In some embodiments, the processor 202 can facilitate storing, sending and/or receiving data associated with the execution of the process simulation model 108 among various components of the system 100. For example, in some embodiments, to facilitate integration of the process simulation model 108, various data associated with performing various functionalities of the process simulation model 108 are stored in the model data storage system 112 and accessible to the process simulation model 108. As such, in some embodiments, the process simulation model 108 can store, send, and/or receive data associated with executing the process simulation model 108 utilizing a single repository (e.g., model data storage system 112). In some embodiments, such data includes current live data generated by the industrial plant system 104, current simulated data (e.g., current model-predicted data generated by a process simulation model 108), historical live data, and/or historical simulated data (e.g., historical model-predicted data generated by a process simulation model). It would be appreciated that these are examples, and not intended to be limiting.

In some embodiments, the apparatus 200 includes input/output circuitry 206 that provides output to the user and, in some embodiments, to receive an indication of a user input. In some embodiments, the input/output circuitry 206 is in communication with the processor 202 to provide such functionality. The input/output circuitry 206 may comprise one or more user interface(s) and in some embodiments includes a display 210 that comprises the interface(s) rendered as a web user interface, an application user interface, a user device, a backend system, or the like. In some embodiments, the input/output circuitry 206 also includes a keyboard, a mouse, a joystick, a touch screen, touch areas, soft keys a microphone, a speaker, and/or other input/output mechanisms. In various examples of the present disclosure, the display 210 may include a liquid crystal display (LCD), a light-emitting diode (LED) display, a plasma (PDP) display, a quantum dot (QLED) display, and/or the like. The processor 202 and/or input/output circuitry 206 may be configured to control one or more functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a client device and/or other display associated with a user.

In some embodiments, the apparatus 200 includes communications circuitry 208. The communications circuitry 208 includes any means such as a device or circuitry embodied in either hardware or a combination of hardware and software that is configured to receive and/or transmit data from/to a network and/or any other device, circuitry, or module in communication with the apparatus 200. In this regard, in some embodiments the communications circuitry 208 includes, for example, a network interface for enabling communications with a wired or wireless communications network. Additionally or alternatively in some embodiments, the communications circuitry 208 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 208 includes circuitry for interacting with the antenna(s) and/or other hardware or software to cause transmission of signals via the antenna(s) or to handle receipt of signals received via the antenna(s). In some embodiments, the communications circuitry 208 enables transmission to and/or receipt of data from user device, one or more asset(s) or accompanying sensor(s), and/or other external computing device in communication with the apparatus 200.

In some embodiments, the apparatus 200 includes process modeling and simulation circuitry 212. The process modeling and simulation circuitry 212 includes hardware, software, firmware, and/or a combination thereof, configured to perform various functionalities associated with the process simulation model 108. In some embodiments, the process modeling and simulation circuitry 212 includes hardware, software, firmware, and/or a combination thereof configured to perform a variety of calculations to simulate the execution of defined process(es) associated with the industrial plant system 104. In some embodiments, the process modeling and simulation circuitry 212 is configured to simulate process(es)/equipment conditions based on first-principles modelling.

In some embodiments, the process modeling and simulation circuitry 212 is configured to perform steady-state simulations. In some embodiments, the process modeling and simulation circuitry 212 is configured to perform dynamic simulations. In some embodiments, the process modeling and simulation circuitry 212 includes hardware, software, firmware, and/or a combination thereof, configured to create or receive and maintain flowsheets (e.g., process definition document(s)) which simulate a general flow of plant processes/equipment of the plant embodied by the industrial plant system 104. The flowsheets can define asset models and their associated properties utilized by the process simulation model 108 to perform a simulation of the process. In some embodiments, the flowsheet is configured to model relationships between processes/equipment of the plant. The flowsheet model, for example, may relate individual processing equipment (e.g., pumps, heat exchangers, distillation unit, etc.) to the performance parameters of overall plant process. In some embodiments, the process simulation model 108 is configured perform one or more of its calculations (e.g., implement one or more algorithms) within the flowsheet. In some embodiments, the process modeling and simulation circuitry 212 includes a separate processor, specially configured field programmable gate array (FPGA), or a specially programmed application-specific integrated circuit (ASIC).

In some embodiments, the process modeling and simulation circuitry 212 includes hardware, software, firmware, and/or a combination thereof, configured to receive input data from the model data storage system 112, perform, based on the input data, a variety of calculations to simulate the execution of a defined process(es) associated with the industrial plant system 104, and generate predictions (e.g., model-predicted data) that may be used to, for example, monitor, control, and/or optimize the industrial plant system 104 (e.g., plant thereof). In some of the embodiments, substantially all of the data utilized by the process simulation model 108 to perform its various functionalities is stored in the model data storage system 112.

In some embodiments, the apparatus 200 includes API processing circuitry 214. The API processing circuitry 214 includes hardware, software, firmware, and/or a combination thereof, that performs various functionalities associated with enabling dynamic external access to a process simulation model, such as the process simulation model 108.

Additionally or alternatively, in some embodiments, the API processing circuitry 214 includes hardware, software, firmware, and/or a combination thereof, for, in conjunction with the communications circuitry 208 and the process modeling and simulation circuitry 212, establishing a communication endpoint to access one or more API calls that define one or more procedures corresponding to a process simulation model, as described in more detail below.

Additionally or alternatively, in some embodiments, the API processing circuitry 214 includes hardware, software, firmware, and/or a combination thereof, for, in conjunction with the communications circuitry 208 and the process modeling and simulation circuitry 212, receiving a request to initiate a particular API call that initiates an interaction with the process simulation model, as described in more detail below.

Additionally or alternatively, in some embodiments, the API processing circuitry 214 includes hardware, software, firmware, and/or a combination thereof, for, in conjunction with the process modeling and simulation circuitry 212, executing the interaction with the process simulation model in response to the request, as described in more detail below.

FIG. 3 illustrates a block diagram of an example apparatus that may be specially configured in accordance with an example embodiment of the present disclosure. Specifically, FIG. 3 depicts an example computing apparatus 300 specially configured in accordance with at least some example embodiments of the present disclosure. In some embodiments, the user device 114, and/or a portion thereof, is embodied by one or more system(s), such as the apparatus 300 as depicted and described in FIG. 3. The apparatus 300 includes processor 302, memory 304, input/output circuitry 306, communications circuitry 308, display 310, API processing circuitry 312, and user interface processing circuitry 314. In some embodiments, the apparatus 300 is configured, using one or more of the sets of circuitry 302-314 to execute and perform the operations described herein.

In some embodiments, the processor 302 (and/or co-processor or any other processing circuitry assisting or otherwise associated with the processor) is/are in communication with the memory 304 via a bus for passing information among components of the apparatus 300. In some embodiments, for example, the memory 304 is non-transitory and may include, for example, one or more volatile and/or non-volatile memories. In other words, for example, the memory 304 in some embodiments includes or embodies an electronic storage device (e.g., a computer readable storage medium). In some embodiments, the memory 304 is configured to store information, data, content, applications, instructions, or the like, for enabling the apparatus 300 to carry out various functions in accordance with example embodiments of the present disclosure.

The processor 302 may be embodied in a number of different ways. For example, in some example embodiments, the processor 302 includes one or more processing devices configured to perform independently. Additionally or alternatively, in some embodiments, the processor 302 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 300, and/or one or more remote or "cloud" processor(s) external to the apparatus 300.

In an example embodiment, the processor 302 is configured to execute instructions stored in the memory 304 or otherwise accessible to the processor. Alternatively or additionally, the processor 302 in some embodiments is configured to execute hard-coded functionality. As such, whether configured by hardware or software methods, or by a combination thereof, the processor 302 represents an entity (e.g., physically embodied in circuitry) capable of performing operations according to an embodiment of the present disclosure while configured accordingly. Alternatively or additionally, as another example in some example embodiments, when the processor 302 is embodied as an executor of software instructions, the instructions specifically configure the processor 302 to perform the algorithms embodied in the specific operations described herein when such instructions are executed. As one particular example embodiment, the processor 302 is configured to perform various operations associated with accessing and providing a dynamic user interface to a process simulation model, such as the process simulation model 108.

In some embodiments, the apparatus 300 includes input/output circuitry 306 that provides output to the user and, in some embodiments, to receive an indication of a user input. In some embodiments, the input/output circuitry 306 is in communication with the processor 302 to provide such functionality. The input/output circuitry 306 may comprise one or more user interface(s) and in some embodiments includes a display 310 that comprises the interface(s) rendered as a web user interface, an application user interface, a user device, a backend system, or the like. In some embodiments, the input/output circuitry 306 also includes a keyboard, a mouse, a joystick, a touch screen, touch areas, soft keys a microphone, a speaker, and/or other input/output mechanisms. In various examples of the present disclosure, the display 310 may include a liquid crystal display (LCD), a light-emitting diode (LED) display, a plasma (PDP) display, a quantum dot (QLED) display, and/or the like. The processor 302 and/or input/output circuitry 306 may be configured to control one or more functions of one or more user interface elements through computer program instructions (e.g., software and/or firmware) stored on a memory accessible to the processor (e.g., memory 304, and/or the like). In some embodiments, the input/output circuitry 306 includes or utilizes a user-facing application to provide input/output functionality to a client device and/or other display associated with a user.

In some embodiments, the apparatus 300 includes communications circuitry 308. The communications circuitry 308 includes any means such as a device or circuitry embodied in either hardware or a combination of hardware and software that is configured to receive and/or transmit data from/to a network and/or any other device, circuitry, or module in communication with the apparatus 300. In this regard, in some embodiments the communications circuitry 308 includes, for example, a network interface for enabling communications with a wired or wireless communications network. Additionally or alternatively in some embodiments, the communications circuitry 308 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 308 includes circuitry for interacting with the antenna(s) and/or other hardware or software to cause transmission of signals via the antenna(s) or to handle receipt of signals received via the antenna(s). In some embodiments, the communications circuitry 308 enables transmission to and/or receipt of data from user device, one or more asset(s) or accompanying sensor(s), and/or other external computing device in communication with the apparatus 300.

In some embodiments, the apparatus 300 includes API processing circuitry 312. The API processing circuitry 312 includes hardware, software, firmware, and/or a combination thereof, that performs various functionalities associated with enabling dynamic external access to a process simulation model, such as the process simulation model 108.

Additionally or alternatively, in some embodiments, the apparatus 300 includes user interface processing circuitry 314. The user interface processing circuitry 314 includes hardware, software, firmware, and/or a combination thereof, configured to perform various functionalities associated with providing a dynamic user interface to a process simulation model, such as the process simulation model 108.

Additionally or alternatively, in some embodiments, the API processing circuitry 312 and the user interface processing circuitry 314 work together to provide the dynamic external access to a process simulation model that enables the desired user interface to the process simulation model to be created, updated, and/or revised.

Additionally or alternatively, in some embodiments, the API processing circuitry 312 includes hardware, software, firmware, and/or a combination thereof, for, in conjunction with the communications circuitry 308, sending one or more API calls to the process simulation model and receiving requested information in response.

Additionally or alternatively, in some embodiments, the user interface processing circuitry 314 includes hardware, software, firmware, and/or a combination thereof, for, in combination with the display 310, displaying at least some of the requested information.

Additionally or alternatively, in some embodiments, the API processing circuitry 312 includes hardware, software, firmware, and/or a combination thereof, for, in conjunction with the communications circuitry 308, sending one or more API calls to the process simulation model requesting changes to be made to the process simulation model and receiving information corresponding to a portion of the process simulation model that changed in response.

In some embodiments, the apparatus 300 includes interface processing circuitry 314. In some embodiments, the user interface processing circuitry 314 includes hardware, software, firmware, and/or a combination thereof, for, in combination with the display 310, dynamically updating the information displayed with the information corresponding to the portion of the process simulation model that changed.

As described above, in some embodiments the dynamic, duplex API calls enable operations via communication across a network, with a client application on a local device driving a process simulation service instance located on a remote server. In some other embodiments, the dynamic, duplex API calls enable inter-process communication between a client application and the process simulation service application running on the same device. FIG. 4 illustrates a block diagram of such example architectures in accordance with example embodiments of the present disclosure. As seen in FIG. 4, in some embodiments of the present disclosure a process simulation model 402 is in communication with a process user interface 404 via a communication hub 406. In some embodiments, as described above, dynamic, duplex API calls enable communication between the process simulation model 402 and the process user interface 404. In some embodiments, a dynamic user interface to the process simulation model 402 is provided via the process user interface 404. In some embodiments, the communication hub 406 includes hardware, software, firmware, and/or a combination thereof, for enabling the dynamic, duplex API calls between the process simulation model 402 and the process user interface 404.

In some embodiments, the process simulation model 402, the communication hub 406, and the process user interface 404 all reside on a single computing device 410. In some alternative embodiments, the process simulation model 402 resides on a first computing device 412, which may be a remote server or other remote device (such as the apparatus 200 of FIG. 2), while the process user interface 404 resides on a second computing device 414, which may be a local device (such as the apparatus 300 of FIG. 3). In such alternative embodiments, the communication hub 406 may reside on the first computing device 412, the second computing device 414, or a third computing device.

Having described example systems, apparatuses, data architectures, and model implementations in accordance with the present disclosure, example processes for enabling dynamic external access to a process simulation service and providing a dynamic user interface to a process simulation service (such as process modeling and simulation system 102) will now be discussed. It will be appreciated that each of the flowcharts depicts an example computer-implemented process that is performable by one or more of the apparatuses, systems, devices, and/or computer program products described herein, for example utilizing one or more of the specially configured components thereof.

The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

Referring now to FIG. 5, a flowchart including example operations of an example process for enabling dynamic external access to a process simulation service is illustrated. Specifically, FIG. 5 illustrates an example computer-implemented process 500. In some embodiments, the process 500 is embodied by computer program code stored on a non-transitory computer-readable storage medium of a computer program product configured for execution to perform the process as depicted and described. Alternatively or additionally, in some embodiments, the process 500 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with separate physical component(s) of one or more industrial plants, and/or the like.

For purposes of simplifying the description, FIG. 5 describes actions from the point of view of a process simulation system, such as the process modeling and simulation system 102 of FIG. 1 as implemented in the apparatus 200 of FIG. 2. For some or all of the blocks of FIG. 5, there may also be a complementary action taken from the point of view of a process user interface, such as the process user interface 404 of FIG. 4.

At block 502, a processor (such as, but not limited to, the processor 202 of the apparatus 200 described above in connection with FIG. 2, along with the API processing circuitry 214) establishes a communication endpoint to a process simulation system for enabling duplex communication with a user interface (such as process user interface 404 of FIG. 4, which may reside on apparatus 300 of FIG. 3). In some embodiments, the communication endpoint is established within the process simulation system. In some embodiments, the duplex communication between the process simulation system and the process user interface is accomplished via a plurality of web API calls. In some embodiments, the communication endpoint is established using a WebSocket communication protocol and a SignalR open source software library.

In some embodiments, the communication endpoint creates a new application program interface (API) on top of the process simulation service, which allows users to connect to the process simulation service and access its modeling environment via the endpoint. In some embodiments, the creation of a new API on top of the process simulation service enables the dynamic API calls that may not be available in a native API.

In some embodiments, the web API calls that are available to communicate with the modeling environment are not fixed, but rather are dynamic based on the actual setup of the modeling environment (e.g., what assets are available in the flowsheet, etc.). In some embodiments, the web API calls are text based. In some embodiments, the web API calls can instruct the process simulation service to take some action, such as provide information regarding a process simulation model or change a process simulation model. For example, in some embodiments one or more JSON-formatted requests are transmitted for processing.

In some embodiments, a software developer tool kit provides a plurality of example web API calls for causing the process simulation service to perform a plurality of different actions. In some embodiments, the web API calls are written in Python using Microsoft Visual Studio Code as the integrated development environment.

As described further below, in some embodiments the communication endpoint enables the creation and operation of a dynamic user interface that can dynamically access the process simulation service. As described above, the process simulation service can be on the same device as the user interface, or the process simulation service can be cloud-based with respect to a separate end user device that uses a dynamic user interface to access the process simulation service.

At block 504, a processor (such as, but not limited to, the processor 202 of the apparatus 200 described above in connection with FIG. 2, along with the API processing circuitry 214) receives, in the form of an API call, a request to initiate an action. In some embodiments, the API call comes from the process user interface 404. In some embodiments, the API call from the process user interface 404 is relayed via a communication hub 406. In some embodiments, the request may include, but is not limited to: a request to launch the process simulation service, a request to load a process simulation model; a request to provide a topology of the process simulation model (e.g., the assets and connections between assets), which in some embodiments may be termed a flowsheet manifest; a request to navigate the flowsheet (i.e., move to a different portion or level of the flowsheet); a request to modify the flowsheet; a request to provide details of one or more objects of the flowsheet (e.g., a list of all valves and associated variable), which in some embodiments is termed an object manifest; a request to modify an object in the flowsheet; a request to provide a state of the server; a request to be informed of changes in the process simulation model (e.g., model solved, variable(s) changed); a request to provide information regarding a specified list of assets, variables, etc., which in some embodiments is termed a batch manifest; a request to modify a specified list of assets, variables, etc., which in some embodiments is termed a batch change manifest; a request to prevent the process simulation model from solving; and a request to force the process simulation model to solve.

At block 506, a processor (such as, but not limited to, the processor 202 of the apparatus 200 described above in connection with FIG. 2, along with the process modeling and simulation circuitry 212) executes the requested interaction with the process simulation model. In some embodiments, depending on the nature of the API call, of which a number of example requests are described above in relation to block 504, the processor may, but is not limited to: load a process simulation model; provide a flowsheet manifest of the process simulation model; move to a different portion or level of the flowsheet; modify the flowsheet; provide an object manifest of the flowsheet; modify an object in the flowsheet; provide a state of the server; provide information about changes in the process simulation model; provide a batch manifest; implement a batch change manifest; stop the process simulation model from solving; and force the process simulation model to solve. In some embodiments, executing the requested interaction comprises sending requesting information to the process user interface 404. In some embodiments, the requested information sent to the process user interface 404 is relayed via a communication hub 406.

In some embodiments, the communication described in relation to FIG. 5 facilitates providing a dynamic user interface to a process simulation model. Referring now to FIG. 6, a flowchart including example operations of an example process for enabling dynamic external access to a process simulation service is illustrated. Specifically, FIG. 6 illustrates an example computer-implemented process 600. In some embodiments, the process 600 is embodied by computer program code stored on a non-transitory computer-readable storage medium of a computer program product configured for execution to perform the process as depicted and described. Alternatively or additionally, in some embodiments, the process 600 is performed by one or more specially configured computing devices, such as the apparatus 300 alone or in communication with one or more other component(s), device(s), system(s), and/or the like. In this regard, in some such embodiments, the apparatus 300 is specially configured by computer-coded instructions (e.g., computer program instructions) stored thereon, for example in the memory 304 and/or another component depicted and/or described herein and/or otherwise accessible to the apparatus 300, for performing the operations as depicted and described. In some embodiments, the apparatus 300 is in communication with one or more external apparatus(es), system(s), device(s), and/or the like, to perform one or more of the operations as depicted and described. For example, the apparatus 300 in some embodiments is in communication with separate physical component(s) of one or more industrial plants, and/or the like. For purposes of simplifying the description, the process 600 is described as performed by and from the perspective of the apparatus 300.

For purposes of simplifying the description, FIG. 6 describes actions from the point of view of a process user interface, such as the process user interface 404 of FIG. 4 as may be implemented in the apparatus 300 of FIG. 3. For some or all of the blocks of FIG. 6, there may also be a complementary action taken from the point of view of a process simulation system, such as the process modeling and simulation system 102 of FIG. 1 as implemented in the apparatus 200 of FIG. 2.

Some embodiments of the disclosure enable an alternative external user interface (UI) to a process simulation model running on the process simulation service to be created for/by a user using a plurality of dynamic, duplex API calls as described above. Some embodiments of the invention provide tools, such as a software developer tool kit described above, for customers to build their own UI. In some embodiments, when the process simulation service receives input from the UI, the process simulation service will reconverge on new model state (i.e., re-solve the model). In some embodiments, such a custom UI enables a user to do from code outside of the process simulation service anything that can be done with the native user interface of the process simulation service.

In some embodiments, the communication endpoint enables the process user interface to audit the process simulation service to learn the topology of the process simulation model. That is, the process user interface can query the process simulation service to learn the flowsheet(s) of the process simulation model (e.g., what are the input? what are the outputs? what are the connections between the inputs and the outputs?). In some embodiments, this enables the process user interface to display (e.g., in graphic or tabular form) portions of the process simulation model. In some embodiments, this enables the process user interface to request additional information. In some embodiments, this enables the process user interface to request changes to the process simulation model, such as changes to one or more variables, which would result in re-solving the model.

At block 602, a processor (such as, but not limited to, the processor 302 of the apparatus 300 described above in connection with FIG. 3, along with the API processing circuitry 312) sends a first API call. In some embodiments, the first API call is sent to a process simulation system, such as process modeling and simulation system 102. In some embodiments, the first API call sent to a process simulation system is relayed via a communication hub 406.

In some embodiments, the first API call is a request for a flowsheet manifest. In some embodiments, such a request for a flowsheet manifest is a request to provide a topology of the process simulation model (e.g., the assets and connections between assets). Such a flowsheet manifest enables the process user interface to begin to develop a representation of the process simulation model for display to a user. Typically, a process simulation model comprises too much information (e.g., flowsheets, assets, variables, etc.) to be sent to the process user interface at one time. As such, in some embodiments the flowsheet manifest includes a subset of the information in the process simulation model, such as only a high level flowsheet. In some embodiments, the process user interface uses the initial information to determine what additional information is needed and to request such additional information. For example, in one specific implementation of a process user interface, the user may only be interested in viewing the valves of the process simulation model and variable values related to the valves. In such an example embodiment, the process user interface may send a request for information related to all of the valves in the process simulation model.

At block 604, a processor (such as, but not limited to, the processor 302 of the apparatus 300 described above in connection with FIG. 3, along with the API processing circuitry 312) receives the information requested at block 602. In some embodiments, the information is received from process modeling and simulation system 102 via the communication hub 406.

At block 606, a processor (such as, but not limited to, the processor 302 of the apparatus 300 described above in connection with FIG. 3, along with the user interface processing circuitry 314) displays the received information. What information is displayed may vary depending on what information is requested. For example, if the requested information is a flowsheet manifest, the displayed information may be a flowsheet in a graphical format. As another example, if the requested information is viewing the valves of the process simulation model and variable values related to the valves, the displayed information may be a tabular view of the valves and associated variable values (e.g., flow rate through the valve).

At block 608, a processor (such as, but not limited to, the processor 302 of the apparatus 300 described above in connection with FIG. 3, along with the API processing circuitry 312) sends a second API call. If information for a particular flowsheet has already been pulled from the process simulation model via the API and used to set up a process user interface, as described above, in some embodiments the process user interface provides access to the specific API calls that interact with the particular assets in the loaded flowsheet.

In some embodiments, the second API call is a request to change information in the process simulation model. In some embodiments, the second API call is sent to the process modeling and simulation system 102 via the communication hub 406. The second API call may comprise a request to change any one or more of many different types of information. For example, the second API call may comprise a request to change one or more attribute values. In some embodiments, a request to change multiple attribute values may be sent in a batch request, with the multiple different values sent in a comma separated value format or the like.

In some embodiments, the process user interface enables a user to drag and drop changes to a displayed flowsheet, such as adding a new asset or replacing an asset. In such embodiments, the second API call requesting a change may comprise details of such a drag and drop change.

At block 610, a processor (such as, but not limited to, the processor 302 of the apparatus 300 described above in connection with FIG. 3, along with the API processing circuitry 312) receives the information requested at block 608. In some embodiments, the information is received from process modeling and simulation system 102 via the communication hub 406.

At block 612, a processor (such as, but not limited to, the processor 302 of the apparatus 300 described above in connection with FIG. 3, along with the user interface processing circuitry 314) displays the received information corresponding to the requested change. What information is displayed may vary depending on what change is requested. For example, if the requested change comprised a batch of attribute value changes, the displayed information may comprise the resulting changed values after the model has re-solved with the changed attribute values.

Although FIG. 6 describes the first API call as a request for information and the second API call as a change request, it should be appreciated that the first API call could be a request for information, a change request, or any other suitable communication between a process user interface and a process simulation system. Although FIG. 6 describes only two API calls, it should be appreciated that a process user interface of embodiments of the present disclosure would typically utilize many more API calls. In some embodiments, subsequent API call reflect or are otherwise based on the changes previously made to the available characteristics of the process simulation model being accessed.

Referring now to FIG. 7, a signal diagram of many different communication events between a process simulation model 402 and a dynamic external user interface 404 are illustrated, in accordance with an example embodiment of the present disclosure. As described above, the communication events illustrated in FIG. 7 may be routed through a communication hub, such as communication hub 406. However, the communication hub is omitted from FIG. 7 for simplicity. As described above, a process simulation model typically comprises too much information (e.g., flowsheets, assets, variables, etc.) to be sent to the process user interface at one time. As such, in some embodiments the process user interface is accessing/displaying/changing only a subset of the information in the process simulation model at any point in time. The process user interface is dynamic in that it provides access to particular portions that are relevant to the particular subset of information (e.g., assets, settings, configurations, and the like) that is actually being accessed.

Example communication events from a dynamic external user interface to a process simulation model include, but are not limited to, the following: a request to launch a process simulation service 702; a request to launch a process simulation model 704; a request for a flowsheet manifest 706; a request to navigate a flowsheet 710; a request to modify a flowsheet 712; a request for an object manifest 714; a request to modify an object 718; a request for the state of the server 720; a request to subscribe to one or more specified variables or the like 726, such that any changes in the specified variable or the like would be communicated from the process simulation model to the process user interface; a request for a batch manifest 728; a request to modify a batch manifest 732; a request to prevent the model from solving 734; and a request for force the model to solve 736.

Example communication events from a process simulation model to a dynamic external user interface include, but are not limited to, the following: serving a requested flowsheet manifest 708; serving a requested object manifest 716; reporting the state of the server 722; broadcasting an event 724, such as the re-solving of the model after changes have been made; and serving a requested batch manifest 730.

Figure 8A:
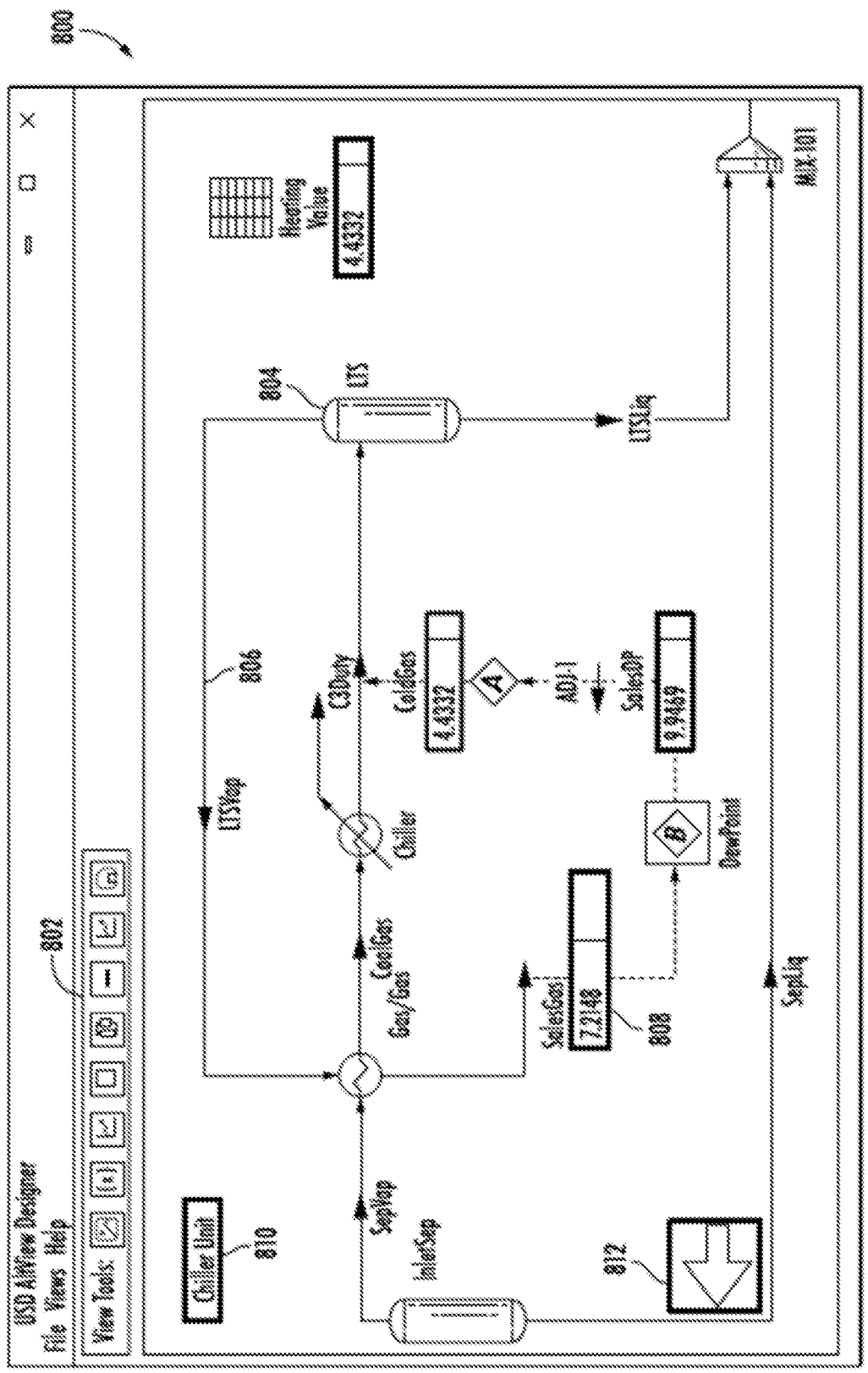
Figure 8B:
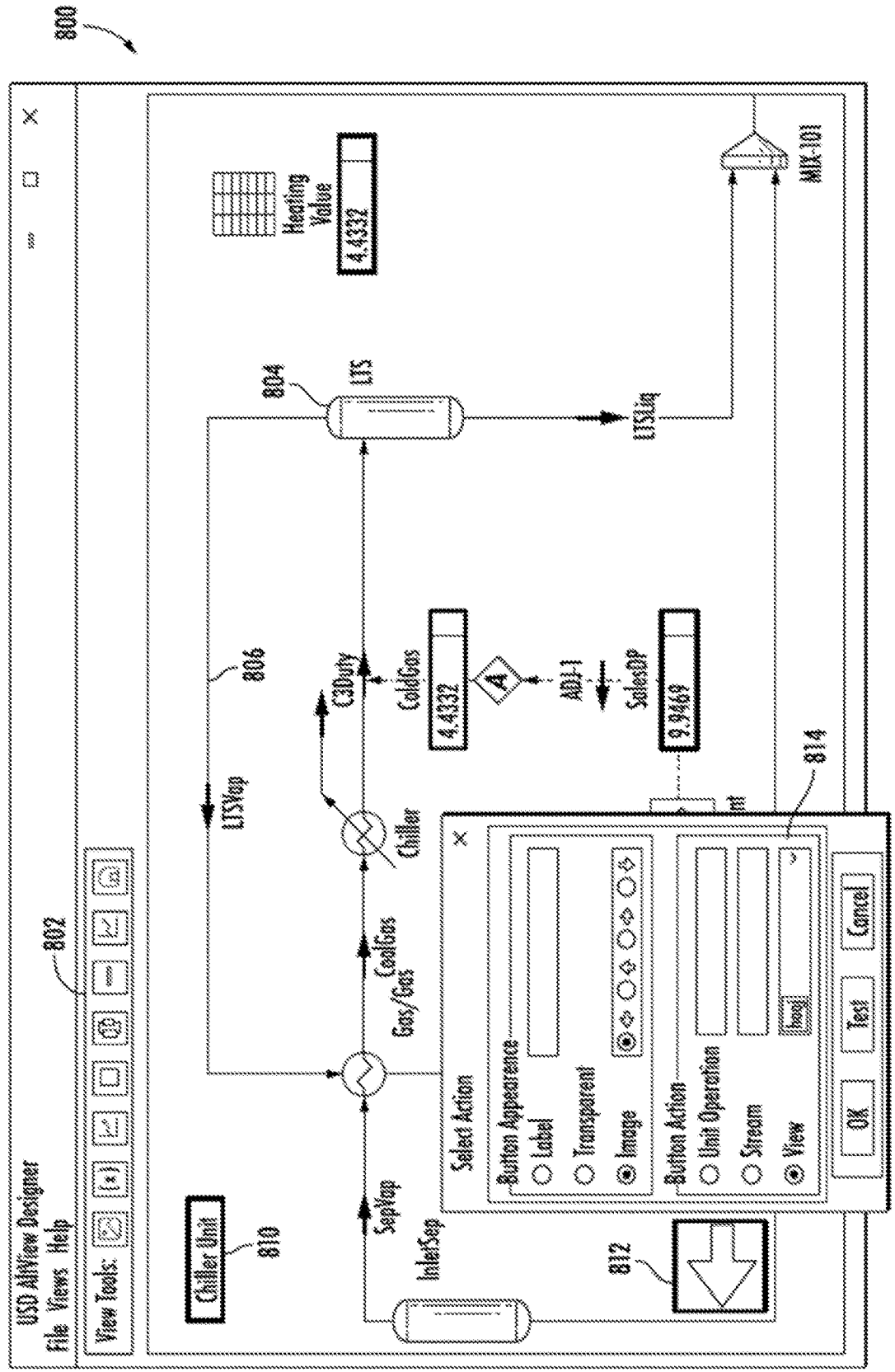
Figure 8C:
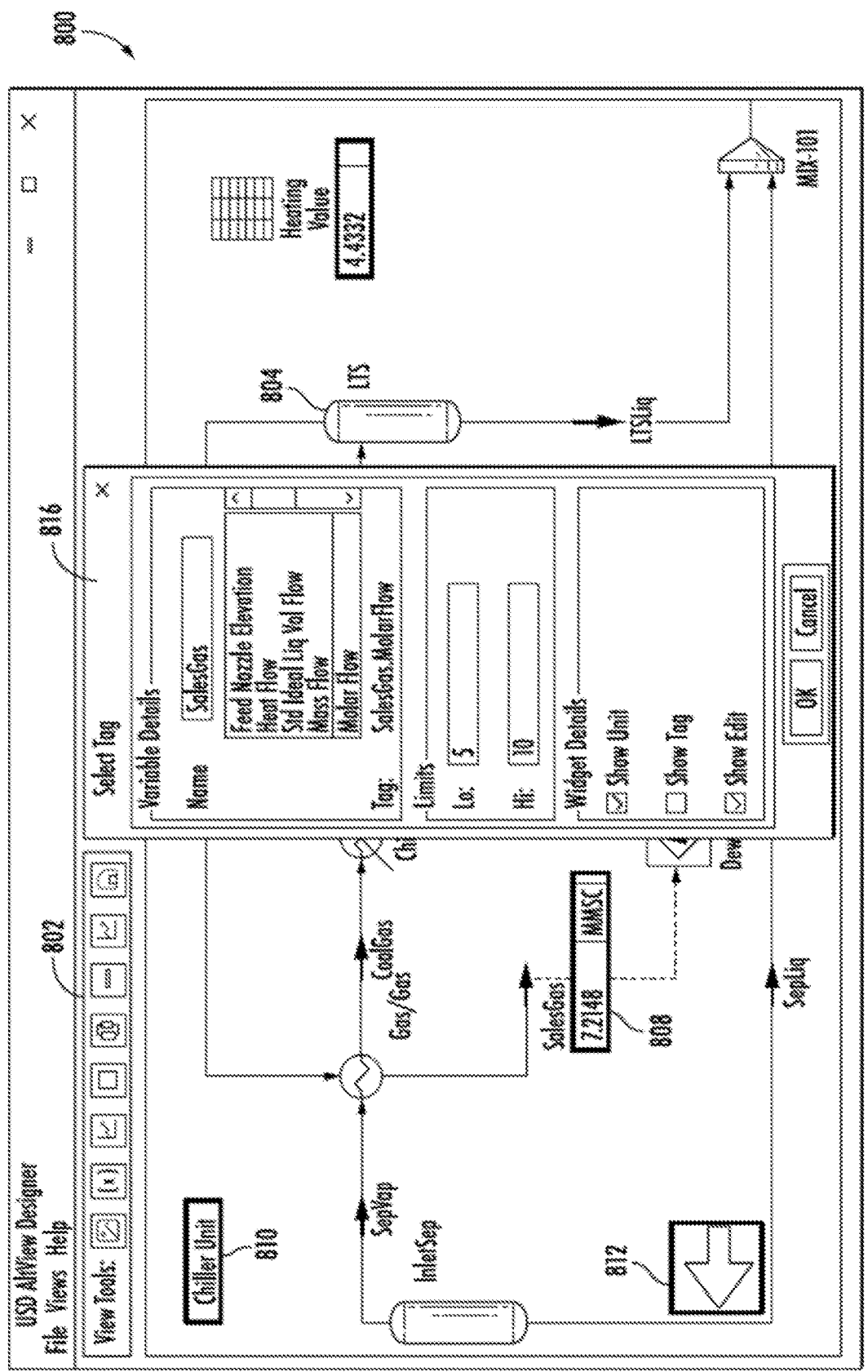
Figure 8D:
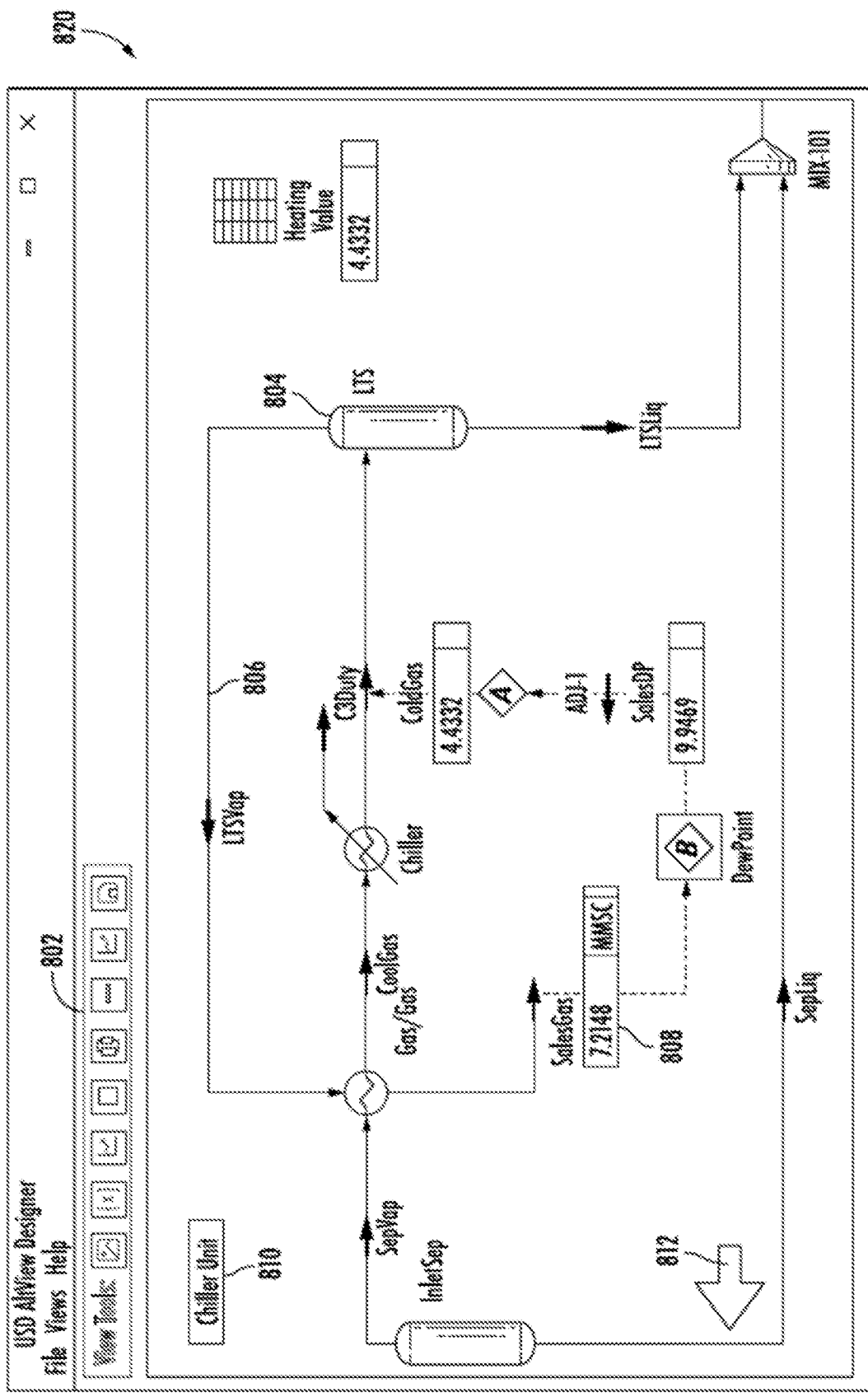

Referring now to FIGS. 8A-8D, example user interface displays are illustrated, such as may be displayed by a process user interface of embodiments of the present disclosure. FIGS. 8A-8C illustrate an example editing mode in which a user can configure the displayed information. FIG. 8D illustrates an example interactive mode in which the displayed information is live and interactive to a user.

FIGS. 8A-8C illustrate an example process flow diagram 800 of a Chiller Unit being configured. FIGS. 8A-C include a plurality of graphical icons representing assets 804 such as hydrotreaters, pumps, distillation columns, etc., and connections 806 therebetween, as well as data displays 808 that display one or more attribute values related to a corresponding asset from the process simulation model, text labels 810, and actions 812. In some embodiments, an editing toolbar 802 is available to provide a plurality of editing tools to enable a user to configure the display. In some embodiments, the assets to be displayed and the connections therebetween are determined by querying a process simulation model using the API calls described herein. In some embodiments, when in the editing mode data from the process simulation model is not updating live and values cannot be input.

In some embodiments, the data displays 808, text labels 810, and actions 812 are termed "hotspots." In some embodiments, the hotspots can display data from the process simulation mode. In the illustrated example, the dark borders around the hotspots indicate that the hotspots are user-configurable in this editing mode. As illustrated, in some embodiments such hotspots can include numeric data, including units of measure (as in the data display 808), text, such as a mode (e.g., steady-state vs dynamic) or process label (as in the text label 810), and/or an action (as in the action 812 which shows a navigation arrow that change the visualization to a different part of the flowsheet).

FIG. 8B illustrates the action hotspot 812 being configured using a pop-up configuration window 814. As illustrated, in some embodiments the pop-up configuration window 814 enables a user to configure the appearance of the icon as well as the action that will happen when a user selects (e.g., clicks on) the icon in the interactive mode. In some other embodiments, other elements of the action hotspot may be configurable.

FIG. 8C illustrates the data display hotspot 808 being configured using a pop-up configuration window 816. As illustrated, in some embodiments the pop-up configuration window 816 enables a user to configure the display name, the asset type, the hi-lo limits, and whether the units of measure are displayed. In some other embodiments, other elements of the data display hotspot may be configurable.

FIG. 8D illustrates an example process flow diagram 820 of a Chiller Unit that has been pre-configured and is now interactive to a user. FIG. 8D includes the same plurality of graphical icons representing assets 804 such as hydrotreaters, pumps, distillation columns, etc., and connections 806 therebetween, as well as data displays 808 that display one or more attribute values related to a corresponding asset from the process simulation model, text labels 810, and actions 812, as in FIGS. 8A-8C. Because FIG. 8D illustrates the interactive mode, the editing toolbar 802 is grayed out and cannot be used. In some embodiments, the hotspots cannot be changed to reference other data or navigation actions (as indicated by the lack of a dark border), but hotspot values refresh automatically as the process simulation model runs, and new values can be input to change the process simulation model. Additionally, in some embodiments the units of measure can be changed, and action hotspots can be activated to navigate between pre-configured views.

FIGS. 9A-9D illustrate example API calls of an example process for providing a dynamic external user interface to a process simulation service. In the illustrated examples of FIGS. 9A-9D, the process simulation service is UniSim Design from Honeywell International Inc. In the illustrated examples of FIGS. 9A-9D, the example API calls are written in Python.

FIG. 9A illustrates an example API call for launching a process simulation service, such as is illustrated as a request to launch a process simulation service 702 in FIG. 7. In some embodiments, it is more common to launch a process simulation service with a specified model file to load. However, there may be occasions where it is to load the process simulation service first, make some calls, and then subsequently load a specified model into the running application. FIG. 9A illustrates an example API call for launching a process simulation service without a specified model.

FIG. 9B illustrates an example API call for launching a process simulation service with a specified model, such as is illustrated as a request to process simulation model 704 in FIG. 7. In some embodiments, the model is specified by passing a fully qualified path to the UniSim Design class constructor. The example in FIG. 9B illustrates a path relative to the folder hosting the Python module under development. In some embodiments, an absolute path can be specified. However, in some embodiments, a completely relative path should not be specified.

FIG. 9C illustrates an example API call for getting/setting variables for a unit operation. FIG. 9D illustrates an example API call for getting three stream variables as a batch request.

CONCLUSION

Embodiments of the present disclosure are described herein with reference to the accompanying drawings, in which some, but not all, embodiments of the disclosure are shown. Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for enabling dynamic external access to a process simulation service, the method comprising:

establishing, by a process simulation service, a communication endpoint to access one or more API calls that define one or more procedures corresponding to a process simulation model associated with one or more assets of an industrial environment, the one or more procedures determined based at least in part on the one or more assets;

receiving, by the process simulation service and via the communication endpoint from an external control service, a request to initiate a particular API call of the one or more API calls, wherein the particular API call initiates an interaction with the process simulation model; and executing, by the process simulation service, the interaction with the process simulation model in response to the request;

wherein the one or more API calls comprise a load simulation call specifying a representation of the assets of the industrial environment to run a simulation on to generate the process simulation model;

wherein the one or more API calls comprise a change attribute value call; and wherein the method further comprises, in response to a change attribute value call, changing an attribute value to a specified value; and wherein the one or more API calls comprise a get flowsheet objects call; and wherein the method further comprises, in response to a get flowsheet objects call, sending a listing of the one or more assets and connections between the one or more assets.

2. The method of claim 1, wherein the one or more API calls comprise a request attribute value call; and wherein the method further comprises, in response to a request attribute value call, sending a current value of a requested attribute.

3. The method of claim 1, wherein the one or more API calls comprise a request asset properties call; and wherein the method further comprises, in response to a request asset properties call, sending a listing of properties for at least one of the one or more assets.

4. The method of claim 1, further comprising registering an event notification trigger with the process simulation service, the event notification trigger associated with completion of at least the interaction with the process simulation model.

5. An apparatus for enabling dynamic external access to a process simulation service, the apparatus comprising at least one processor and at least one non-transitory memory comprising program code, wherein the at least one non-transitory memory and the program code are configured to, with the at least one processor, cause the apparatus to at least:

establish, by a process simulation service, a communication endpoint to access one or more API calls that define one or more procedures corresponding to a process simulation model associated with one or more assets of an industrial environment, the one or more procedures determined based at least in part on the one or more assets;

receive, by the process simulation service and via the communication endpoint from an external control service, a request to initiate a particular API call of the one or more API calls, wherein the particular API call initiates an interaction with the process simulation model; and execute, by the process simulation service, the interaction with the process simulation model in response to the request;

wherein the one or more API calls comprise a load simulation call specifying a representation of the assets of the industrial environment to run a simulation on to generate the process simulation model;

wherein the one or more API calls comprise a change attribute value call; and wherein the at least one non-transitory memory and the program code are further configured to, with the at least one processor, in response to a change attribute value call, cause the apparatus to change an attribute value to a specified value; wherein the one or more API calls comprise a get flowsheet objects call; and wherein the at least one non-transitory memory and the program code are further configured to, with the at least one processor, in response to a get flowsheet objects call, cause the apparatus to send a listing of the one or more assets and connections between the one or more assets.

6. The apparatus of claim 5, wherein the one or more API calls comprise a request attribute value call; and wherein the at least one non-transitory memory and the program code are further configured to, with the at least one processor, in response to a request attribute value call, cause the apparatus to send a current value of a requested attribute.

7. The apparatus of claim 5, wherein the one or more API calls comprise a request asset properties call; and wherein the at least one non-transitory memory and the program code are further configured to, with the at least one processor, in response to a request asset properties call, cause the apparatus to send a listing of properties for at least one of the one or more assets.

8. The apparatus of claim 5, wherein the at least one non-transitory memory and the program code are further configured to, with the at least one processor, cause the apparatus to register an event notification trigger with the process simulation service, the event notification trigger associated with completion of at least the interaction with the process simulation model.

9. A computer program product for enabling dynamic external access to a process simulation service, the computer program product comprising at least one non-transitory computer-readable storage medium having computer-readable program code portions stored therein, the computer-readable program code portions comprising an executable portion configured to:

establish, by a process simulation service, a communication endpoint to access one or more API calls that define one or more procedures corresponding to a process simulation model associated with one or more assets of an industrial environment, the one or more procedures determined based at least in part on the one or more assets;

receive, by the process simulation service and via the communication endpoint from an external control service, a request to initiate a particular API call of the one or more API calls, wherein the particular API call initiates an interaction with the process simulation model; and execute, by the process simulation service, the interaction with the process simulation model in response to the request;

wherein the one or more API calls comprise a load simulation call specifying a representation of the assets of the industrial environment to run a simulation on to generate the process simulation model;

wherein the one or more API calls comprise a change attribute value call;

wherein the computer-readable program code portions further comprise an executable portion configured to, in response to a change attribute value call, change an attribute value to a specified value;

wherein the one or more API calls comprise a get flowsheet objects call; and wherein the computer-readable program code portions further comprise an executable portion configured to, in response to a get flowsheet objects call, send a listing of the one or more assets and connections between the one or more assets.

10. The computer program product of claim 9, wherein the one or more API calls comprise a request attribute value call; and wherein the computer-readable program code portions further comprise an executable portion configured to, in response to a request attribute value call, send a current value of a requested attribute.

11. The computer program product of claim 9, wherein the one or more API calls comprise a request asset properties call; and wherein the computer-readable program code portions further comprise an executable portion configured to, in response to a request asset properties call, send a listing of properties for at least one of the one or more assets.

* * * * *